United States Patent
Kimn et al.

(10) Patent No.: US 11,271,897 B2
(45) Date of Patent: Mar. 8, 2022

(54) ELECTRONIC APPARATUS FOR PROVIDING FAST PACKET FORWARDING WITH REFERENCE TO ADDITIONAL NETWORK ADDRESS TRANSLATION TABLE

(71) Applicant: SAMSUNG ELECTRONICS CO., LTD., Suwon-si (KR)

(72) Inventors: Soungkwan Kimn, Pyeongtaek-si (KR); Taejin Kim, Suwon-si (KR); Seung-Chull Suh, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/504,757

(22) Filed: Jul. 8, 2019

(65) Prior Publication Data

US 2020/0145371 A1     May 7, 2020

(30) Foreign Application Priority Data

Nov. 5, 2018    (KR) .......................... 10-2018-0134227

(51) Int. Cl.
    *H04L 29/12*     (2006.01)
    *H04L 61/2503*     (2022.01)

(52) U.S. Cl.
    CPC ................. *H04L 61/2503* (2013.01)

(58) Field of Classification Search
    CPC ............ H04L 61/2503; H04L 61/2514; H04L 61/255; H04L 29/12; H04L 61/2557;

(Continued)

(56) References Cited

U.S. PATENT DOCUMENTS

| 6,768,738 B1 * | 7/2004 | Yazaki ................. H04L 12/46 370/392 |
| 7,254,639 B1 * | 8/2007 | Siegel ................ H04L 49/3009 370/389 |

(Continued)

FOREIGN PATENT DOCUMENTS

| KR | 10-0388091 B1 | 6/2003 |
| KR | 10-0748090 B1 | 8/2007 |

OTHER PUBLICATIONS

Mishaal Rahman, "Google Pixel 2 Supports Hardware Accelerated Tethering for Better Battery Life while Tethering", Nov. 2, 2017, retrieved from: https://www.xda-developers.com/google-pixel-2-hardware-accelerated-tethering/, pp. 1-14 (14 pages total).

*Primary Examiner* — Minh Chau Nguyen
*Assistant Examiner* — Mehulkumar J Shah
(74) *Attorney, Agent, or Firm* — Sughrue Mion, PLLC

(57) ABSTRACT

An electronic apparatus includes a first translation table that stores information of a first address and a second address; a second translation table that, in response to a condition being satisfied, stores the information of the first address and the second address based on the first translation table; at least one processor configured to translate the first address of a first packet to the second address based on the first translation table; and a forwarding manager that, in response to a second packet including the first address being received and the information of the first address and the second address being stored in the second translation table, translates the first address of the second packet to the second address based on the second translation table, prior to allocating the second packet to the at least one processor.

18 Claims, 24 Drawing Sheets

(58) Field of Classification Search
CPC ... H04L 61/256; H04L 61/6009; H04L 47/10; H04L 49/90; H04L 12/801; H04L 12/891; G05B 19/0421; G06B 19/042
USPC .............. 709/245; 340/16.1; 370/474; 710/3
See application file for complete search history.

(56) References Cited

U.S. PATENT DOCUMENTS

| | | |
|---|---|---|
| 9,654,389 B2 | 5/2017 | Hui et al. |
| 9,736,085 B2 | 8/2017 | Song et al. |
| 9,900,799 B2 | 2/2018 | Cherian et al. |
| 10,033,650 B2 | 7/2018 | Yu et al. |
| 2004/0098448 A1* | 5/2004 | Fukushima ......... H04L 12/1836 709/201 |
| 2004/0246991 A1* | 12/2004 | Tsuzuki ................. H04L 67/14 370/466 |
| 2012/0203909 A1* | 8/2012 | Kavanaugh ......... H04L 61/2517 709/226 |
| 2013/0166667 A1 | 6/2013 | Carr et al. |
| 2015/0304427 A1* | 10/2015 | Ortacdag .............. H04L 63/164 713/160 |
| 2015/0341827 A1 | 11/2015 | Bae et al. |
| 2016/0212031 A1* | 7/2016 | Jain .................... H04L 43/0876 |
| 2016/0241482 A1* | 8/2016 | Tsuruoka .............. H04L 47/621 |
| 2017/0272373 A1* | 9/2017 | Chau ...................... H04L 45/72 |
| 2018/0062914 A1* | 3/2018 | Boutros ............. H04L 61/2592 |
| 2018/0097729 A1 | 4/2018 | Srivastav et al. |

\* cited by examiner

FIG. 4
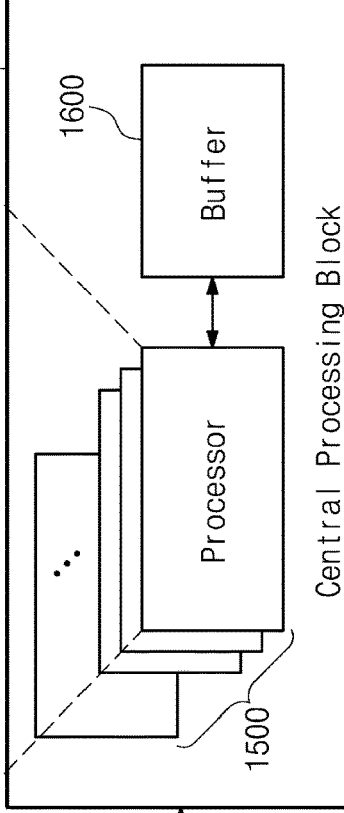
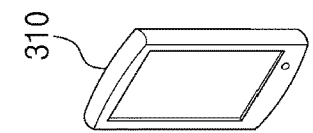
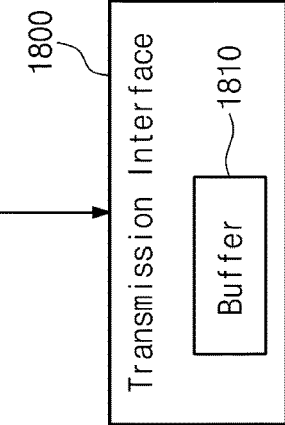
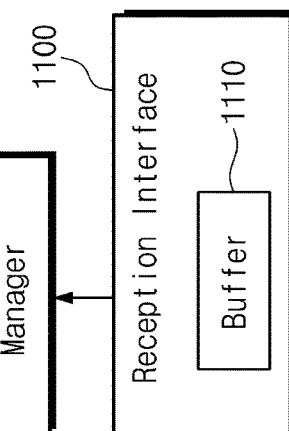
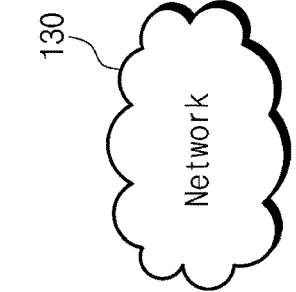

FIG. 12

| Internal Source IP Address | Internal Source Port | External Source Port | External Source IP Address | Destination IP Address | Destination Port |
|---|---|---|---|---|---|
| 192.168.0.2 | 60000 | 50002 | 1.1.1.1 | 2.2.2.2 | 20001 |
| 192.168.0.3 | 60000 | 50003 | 1.1.1.1 | 3.3.3.3 | 30001 |

FIG. 16

| Internal Source IP Address | Internal Source Port | External Source Port | External Source IP Address | Destination IP Address | Destination Port | MAC Address |
|---|---|---|---|---|---|---|
| 192.168.0.3 | 60000 | 50003 | 1.1.1.1 | 3.3.3.3 | 30001 | 12:34:56:78:90:AB |

FIG. 21

| Interface | Processor |
|---|---|
| RmNet0 | 1 |
|  | 2 |
| RmNet1 | 3 |
| WiFi | 4 |
| USB | 5 |
| PCIe | 6 |
| Fast Forwarding | 7 |
| Etc. | 8 |

ELECTRONIC APPARATUS FOR PROVIDING FAST PACKET FORWARDING WITH REFERENCE TO ADDITIONAL NETWORK ADDRESS TRANSLATION TABLE

CROSS-REFERENCE TO RELATED APPLICATION

This application claims priority from Korean Patent Application No. 10-2018-0134227, filed on Nov. 5, 2018, in the Korean Intellectual Property Office, the disclosure of which is incorporated herein by reference in its entirety.

TECHNICAL FIELD

Apparatuses consistent with example embodiments relate to an electronic apparatus, and more particularly, relate to an electronic apparatus for performing network address translation.

DESCRIPTION OF RELATED ART

Recently, various types of electronic apparatuses have been used. An electronic apparatus performs its own functions depending on operations of electronic circuits included in the electronic apparatus to provide a service to a user. The electronic apparatus may provide the service to the user while operating solely or while communicating with another electronic apparatus.

When several electronic apparatuses communicate with each other via a network, one electronic apparatus may directly communicate with another electronic apparatus. Alternatively, in some cases, one electronic apparatus may communicate with a second electronic apparatus via a third electronic apparatus. In this case, the intermediate third electronic apparatus may perform network address translation between the first and second electronic apparatuses.

Due to a limitation on internet protocol (IP) resources, network addresses (e.g., IP addresses) handled by two electronic apparatuses may be different from each other. The network address translation may be performed to map the different network addresses to translate one network address to another network address. Depending on the network address translation, a packet may be transferred from an intended source device to an intended destination device.

However, it may take a long time to perform the network address translation, and this may degrade communication performance. There is a need to communicate a large amount of data, which requires high communication performance. In this regard, decreasing a time taken to perform the network address translation is desirable to communicate the large amount of data.

SUMMARY

One or more example embodiments may provide an electronic apparatus capable of performing fast packet forwarding with reference to an additional network address translation table, without performing a network address translation which requires a considerable time.

In an aspect of an example embodiment, there is provided an electronic apparatus including: a first translation table configured to store information of a first address and information of a second address; a second translation table configured to, in response to a condition being satisfied, store the information of the first address and the information of the second address based on the first translation table; at least one processor configured to, in response to a first packet including the first address being received prior to satisfaction of the condition, translate the first address of the first packet to the second address based on the first translation table; and a forwarding manager to, in response to a second packet including the first address being received and the information of the first address and the information of the second address being stored in the second translation table, translate the first address of the second packet to the second address based on the second translation table, prior to allocating the second packet to the at least one processor.

In an aspect of an example embodiment, there is provided an electronic apparatus including: a first translation table configured to, in response to a first condition being satisfied, store information of a first address and a second address; a forwarding manager configured to, in response to a first packet including the first address being received and the information of the first address and the information of the second address being stored in the first translation table, translate the first address of the first packet to the second address based on the first translation table; a buffer configured to store the first packet including the second address and a signature indicating that the first address of the first packet has been translated into the second address; and at least one processor configured to process the first packet including the second address and output the processed first packet without additional address translation, based on the signature.

In an aspect of an example embodiment, there is provided an electronic apparatus including: at least one processor configured to perform first address translation from a first address of a first packet to a second address, process and output the first packet in a communication between a source device and a destination device; and a forwarding manager configured to, in response to a condition associated with the communication being satisfied, perform second address translation from the first address of a second packet to the second address, wherein in response to the second address translation performed by the forwarding manager, the at least one processor is configured to process and output the second packets without performing the first address translation.

In an aspect of an example embodiment, there is provided an electronic apparatus including: a plurality of processors configured to: in response to receiving first packets each including a first address from an outside, translate the first address of each of the first packets to a second address, and in response to a condition being satisfied in one of the first packets that are received, receive a second packet including the second address from a buffer, the second packet being based on the one of the first packets; and an interface circuit configured to output the first packets and the second packet each including the second address to a destination device, wherein the condition is that a bandwidth to output the one of the first packets is greater than a reference value.

BRIEF DESCRIPTION OF THE DRAWINGS

The above and other objects and features will become apparent by describing in detail example embodiments thereof with reference to the accompanying drawings.

FIG. 4 is a block diagram illustrating an example configuration associated with a network address translator of FIG. 1.

FIG. 12 is a conceptual diagram illustrating an example configuration of information stored in a main network address translation (NAT) table of FIG. 4.

FIG. 16 is a conceptual diagram illustrating an example configuration of information stored in a NAT table for fast forwarding of FIG. 4.

FIG. 21 is a conceptual diagram for describing an example operation of a processor allocator of FIG. 4.

DETAILED DESCRIPTION

Below, some example embodiments will be described in detail and clearly with reference to the accompanying drawings such that those skilled in the art can easily implement the disclosure.

It will be understood that, although the terms first, second, etc. may be used herein to describe various elements, these elements should not be limited by these terms. These terms are only used to distinguish one element from another. Any references to singular ay include plural unless expressly stated otherwise. In addition, unless explicitly described to the contrary, an expression such as "comprising" or "including" will be understood to imply the inclusion of stated elements but not the exclusion of any other elements. Also, the terms, such as 'part', 'unit' or 'module', etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Figure 1:
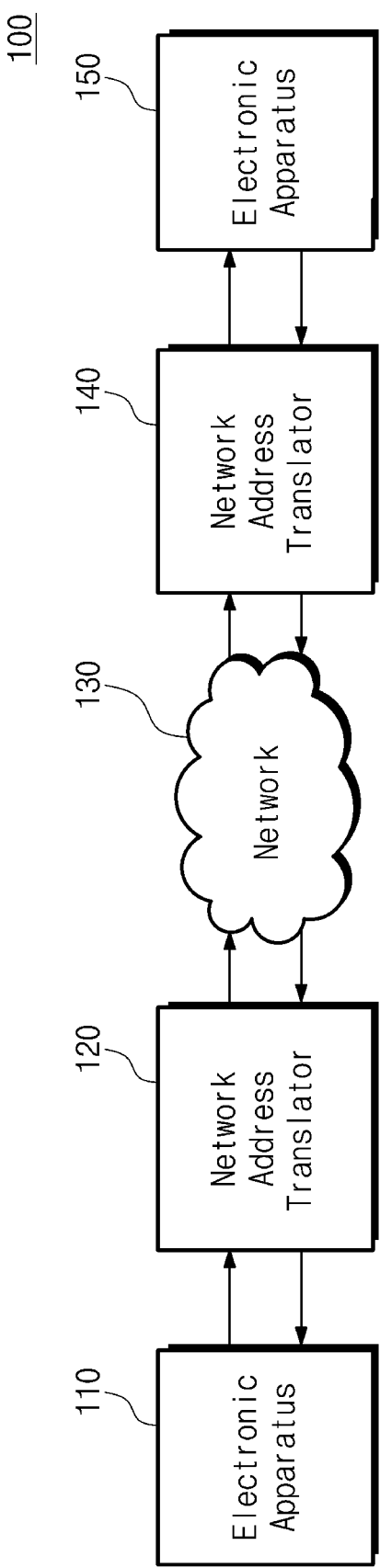
FIG. 1 is a block diagram illustrating an example configuration of a network system which includes network address translators according to some example embodiments.

FIG. 1 is a block diagram illustrating an example configuration of a network system 100 which includes network address translators 120 and 140 according to some example embodiments.

The network system 100 may include electronic apparatuses 110 and 150 connected via a network 130. The network 130 may provide a wired/wireless channel for transferring data/signals communicated in compliance with various wired/wireless protocols such as Ethernet, long term evolution (LTE), worldwide interoperability for microwave access (WIMAX), code division multiple access (CDMA), and/or the like.

Each of the electronic apparatuses 110 and 150 may be one of various electronic apparatuses such as, but not limited to, a desktop computer, a laptop computer, a tablet computer, a smart phone, a wearable device, a video game console, a workstation, a server, an electric vehicle, a household appliance, a medical device, and/or the like. The electronic apparatuses 110 and 150 may exchange data/signals while communicating with each other via the network 130 to provide services to users.

For example, the electronic apparatuses 110 and 150 may be configured as a server-client structure. Alternatively, the electronic apparatuses 110 and 150 may be two terminal devices of an equivalent level. The disclosure is not limited thereto, and the configuration for the electronic apparatuses 110 and 150 may be variously changed or modified.

For example, data/signals exchanged between the electronic apparatuses 110 and 150 may be transferred in a form of a packet. A header of the packet may include information associated with a network address (e.g., an internet protocol (IP) address) of a source device which initially has generated the packet and a network address of a destination device (or a destination apparatus) which is to finally receive the packet. The packet may be transferred from an intended source device to an intended destination device based on the network address information included in the header.

As there is a limitation on IP resources, an internal IP address may be given separately from an external IP address. In this regard, the network address translator 120 may perform network address translation between the electronic apparatus 110 and the network 130, and the network address translator 140 may perform network address translation between the electronic apparatus 150 and the network 130.

The network address translator 120 may map an IP address handled by the electronic apparatus 110 with an IP address handled by the network address translator 120, to perform network address translation between the two IP addresses. The network address translator 140 may map an IP address handled by the electronic apparatus 150 with an IP address handled by the network address translator 140, to perform network address translation between the two IP addresses.

The network address translators 120 and 140 may communicate with each other via the network 130 for the electronic apparatuses 110 and 150 based on the translated IP addresses. The network address translators 120 and 140 may communicate with the electronic apparatuses 110 and 150 based on mapping relationships between the translated IP addresses and the original IP addresses. Thus, a packet may be transferred from an intended source device to an intended destination device between the electronic apparatuses 110 and 150.

For example, communication between the network address translators 120 and 140 and the electronic apparatuses 110 and 150 may be performed in compliance with various wired/wireless interface protocols such as universal serial bus (USB), peripheral component interconnect express (PICe), mobile PCIe (M-PCIe), Firewire, Bluetooth, near field communication (NFC), wireless fidelity (Wi-Fi), and/or the like.

The network address translators 120 and 140 may employ at least one of various address translation schemes such as a network address translation (NAT) scheme, an NAT64 scheme, a customer-side translator (cLAT) scheme, a provider-side translator (pLAT) scheme, and/or the like, to perform network address translation.

However, it may be readily understood that the disclosure is not limited to the examples described with reference to FIG. 1 and may be variously changed or modified to perform network address translation and packet forwarding, which will be described below.

Figure 2:
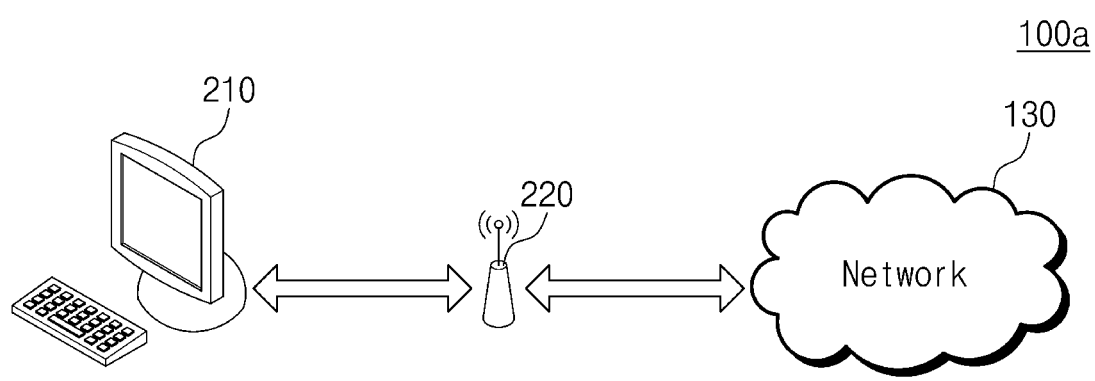
FIGS. 2 and 3 are conceptual diagrams illustrating example implementations associated with a network system of FIG. 1.
Figure 3:
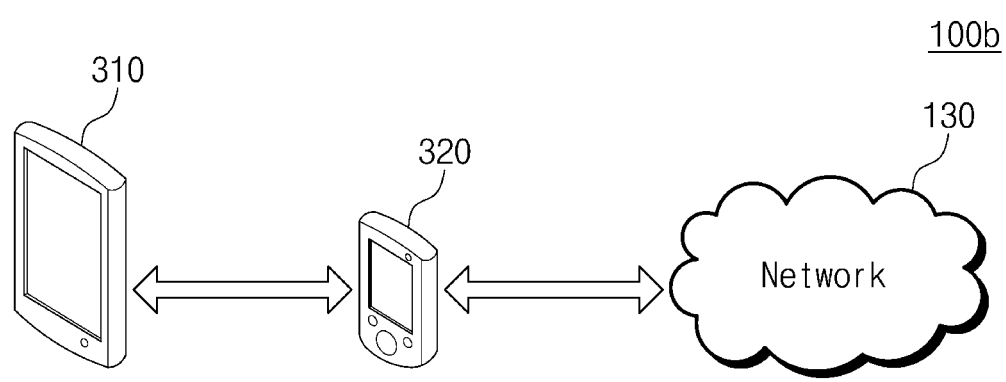

FIGS. 2 and 3 are conceptual diagrams illustrating example implementations associated with the network system 100 of FIG. 1.

Referring to FIG. 2, the network system 100 of FIG. 1 may include a network system 100a of FIG. 2. For example, an electronic apparatus 110 and a network address translator 120 of FIG. 1 may include an electronic apparatus 210 and a communication arbitrator 220. The electronic apparatus 210 may be connected to the network 130 via the communication arbitrator 220. The communication arbitrator 220 may perform network address translation for the electronic apparatus 210.

For example, the electronic apparatus 210 may be a desktop computer, and the communication arbitrator 220 may be one of electronic apparatuses such as a router, a switch, a hub, a wireless access point (WAP), and/or the like. For example, the electronic apparatus 210 may communicate with the communication arbitrator 220 in compliance with an interface protocol such as USB, PCIe, Wi-Fi, and/or the like, and the communication arbitrator 220 may be connected to the network 130 in compliance with a communication protocol such as Ethernet, Wi-Fi, WIMAX, and/or the like.

Referring to FIG. 3, the network system 100 of FIG. 1 may include a network system 100b of FIG. 3. For example, the electronic apparatus 110 and the network address translator 120 may include an electronic apparatus 310 and an electronic apparatus 320. The electronic apparatus 310 may be connected to the network 130 via the electronic apparatus 320. The electronic apparatus 320 may perform network address translation for the electronic apparatus 310.

For example, the electronic apparatus 310 may be a laptop computer or a tablet compute, and the electronic apparatus 320 may be a smart phone. For example, the electronic apparatus 310 may communicate with the electronic apparatus 320 in compliance with an interface protocol such as USB, Wi-Fi, and/or the like, and the electronic apparatus 320 may be connected to the network 130 in compliance with a communication protocol such as LTE, CDMA, Wi-Fi, and/or the like.

The network address translator 120 may be a dedicated device (e.g., the communication arbitrator 220) which is specialized for arbitrating in communication and performing network address translation. Alternatively, the network address translator 120 may be a general-purpose device (e.g., the electronic apparatus 320) capable of performing network address translation for another electronic apparatus as well as actively communicating via the network 130 by itself. The disclosure is not limited thereto, and the implementation of the network address translator 120 may be variously changed or modified.

FIGS. 2 and 3 have been described with regard to the electronic apparatus 110 and the network address translator 120 of FIG. 1. However, it may be readily understood that the descriptions of FIGS. 2 and 3 may also be applied with regard to the electronic apparatus 150 and the network address translator 140 of FIG. 1. In addition, it may be readily understood that the configuration of the network system 100 may be changed or modified differently from the configurations of the network systems 100a and 100b. FIGS. 1 to 3 are provided to facilitate better understanding, and are not intended to limit the disclosure.

For example, when the electronic apparatus 320 is connected to a wireless communication network, the electronic apparatus 310 may access the wireless communication network through tethering to the electronic apparatus 320 (e.g., in compliance with an interface protocol such as USB or Wi-Fi). In this case, while network address translation is performed by the electronic apparatus 320, it may take a considerable time to perform address searching, address translation, packet filtering, and packet forwarding.

Due to this reason, performance of communication between the electronic apparatus 310 and the wireless communication network through the tethering may be considerably lower than performance of communication between the electronic apparatus 320 and the wireless communication network (e.g., the tethering may support a bandwidth of about 50% of a bandwidth available in direct communication). Communicating a large amount of data may be demanded, and low performance of the tethering may be insufficient to communicate a large amount of data.

Thus, example embodiments may perform fast packet forwarding, which takes a reduced time to perform the network address translation. Therefore, communication performance may be improved, and a packet may be rapidly transferred from a source device to a destination device. Herein, it may be readily understood that the tethering is just an example provided to facilitate better understanding of the disclosure and example embodiments may be employed for all kinds of communication accompanying network address translation.

FIG. 4 is a block diagram illustrating an example configuration associated with the network address translator 120 or 140 of FIG. 1.

In some example embodiments, the network address translator 120 or 140 of FIG. 1 may be implemented in an electronic apparatus 1000. The electronic apparatus 1000 may be implemented in any kind of device capable of performing network address translation. For example, the electronic apparatus 1000 may be a dedicated device such as the communication arbitrator 220 of FIG. 2. Alternatively, for example, the electronic apparatus 1000 may be a general-purpose device such as the electronic apparatus 320 of FIG. 3, and may perform network address translation between the network 130 and the electronic apparatus 310.

Below, the network address translation between the network 130 and the electronic apparatus 310 will be described to facilitate better understanding, but the disclosure is not limited thereto.

In some example embodiments, the electronic apparatus 1000 may include a reception interface circuit 1100, a fast forwarding manager 1200, an NAT table 1300 for fast forwarding (hereinafter referred to as a "fast forwarding NAT table 1300"), a processor allocator 1400, a central processing block CPB, a main NAT table 1700, and a transmission interface circuit 1800.

The reception interface circuit 1100 may communicate with a source device to receive a packet transferred from the source device. For example, the reception interface circuit 1100 may be connected to the source device via the network 130, and may receive a packet RPK transferred from the source device. The reception interface circuit 1100 may receive the packet RPK in compliance with an interface protocol (e.g., RmNet) supported by the reception interface circuit 1100.

The reception interface circuit 1100 may include various hardware circuits (e.g., an analog circuit, a logic circuit, and/or the like) for receiving and processing the received packet RPK. The reception interface circuit 1100 may include a buffer 1110. The reception interface circuit 1100 may temporarily store the received packet RPK in the buffer 1110.

The fast forwarding manager 1200 may determine whether to provide fast forwarding with regard to the packet RPK. The fast forwarding NAT table 1300 may store information used to provide the fast forwarding for the packet RPK. The fast forwarding manager 1200 may provide the fast forwarding with reference to the fast forwarding NAT table 1300.

The central processing block CPB may include processors 1500 and a buffer 1600. The processors 1500 may perform a variety of processing on the packet RPK to prepare for a packet (e.g., a packet TPK) to be output to a destination device. The buffer 1600 may store information processed or to be processed by the processors 1500. For example, the buffer 1600 may store information associated with the packets RPK and TPK.

The processor 1500 may perform network address translation for the packet RPK. The main NAT table 1700 may store information used to perform the network address translation for the packet RPK. The processors 1500 may translate (or map) an address included in the packet RPK to another address, with reference to the buffer 1600 and the main NAT table 1700.

The processors 1500 may include processor cores configured to execute instruction sets of a program code. When the program code of software and/or firmware is executed on a user space or a kernel space, the processors 1500 may process operations of the instruction sets requested by the program code such that operations intended by the program code are performed. To this end, the processor cores of the processors 1500 may include general-purpose and/or special-purpose hardware circuits capable of processing various arithmetic/logical operations.

In example embodiments, when the fast forwarding is not provided with regard to the packet RPK, the processors 1500 may perform operations of a main translation process PMT. On the other hand, when the fast forwarding is provided with regard to the packet RPK, the processors 1500 may perform operations of a fast forwarding process PFF without the main translation process PMT. Such example embodiments will be described below in detail.

The processor allocator 1400 may select a processor which is to process the packet RPK among the processors 1500. The processor allocator 1400 may allocate the packet RPK to the selected processor and provide the packet RPK to the buffer 1600 such that the selected processor processes the packet RPK.

The transmission interface circuit 1800 may receive the packet TPK prepared by the processors 1500. The transmission interface circuit 1800 may include a buffer 1810. The transmission interface circuit 1800 may temporarily store the prepared packet TPK in the buffer 1810.

The transmission interface circuit 1800 may be connected to the destination device (e.g., the electronic apparatus 310). The transmission interface circuit 1800 may communicate with the destination device such that the packet TPK in the buffer 1810 processed by the processors 1500 is output to the destination device. The transmission interface circuit 1800 may output the packet TPK to the destination device in compliance with an interface protocol (e.g., USB or Wi-Fi) supported by the transmission interface circuit 1800. The transmission interface circuit 1800 may include various hardware circuits (e.g., an analogic circuit, a logic circuit, and/or the like) for processing and outputting the packet TPK.

Each of the buffers 1110, 1600, and 1810 may include memory elements configured to store information or data. For example, each of the buffers 1110, 1600, and 1810 may include a volatile memory (such as a static random access memory (SRAM), a dynamic RAM (DRAM), a synchronous DRAM (SDRAM), and/or the like) and/or a nonvolatile memory (such as a phase-change RAM (PRAM), a magneto-resistive RAM (MRAM), a resistive RAM (ReRAM), a ferro-electric RAM (FRAM), and/or the like).

Figure 5:
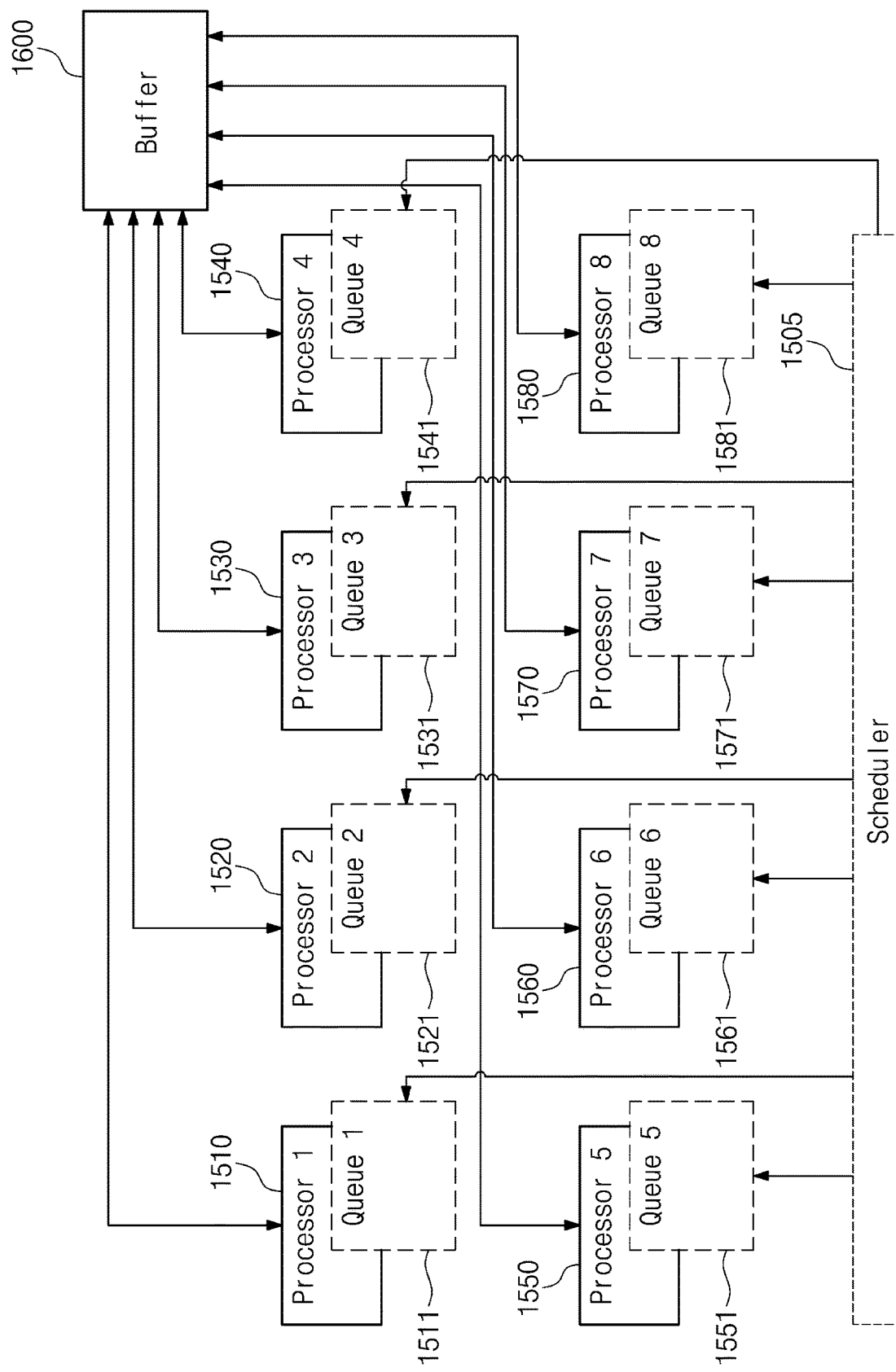
FIG. 5 is a block diagram for describing an example configuration and operation of an electronic apparatus of FIG. 4.

FIG. 5 is a block diagram for describing an example configuration and operation of the electronic apparatus 1000 of FIG. 4.

For example, the processors 1500 of FIG. 4 may include eight (8) processors 1510 to 1580 of FIG. 5. The disclosure is not limited to the processors 1510 to 1580, and the number of processors included in the processors 1500 may be variously changed or modified depending on a design of the electronic apparatus 1000. However, to facilitate better understanding, it will be assumed that the processors 1500 include the eight processors 1510 to 1580 in the following descriptions.

Each of the processors 1510 to 1580 may process operations of instruction sets requested by a program code. For example, the processors 1510 to 1580 may process operations associated with the main translation process PMT and the fast forwarding process PFF.

The scheduler 1505 may schedule tasks to be processed by the processors 1510 to 1580, and may allocate the tasks to the processors 1510 to 1580. For example, the scheduler 1505 may allocate tasks for performing the main translation process PMT and the fast forwarding process PFF to the processors 1510 to 1580. The scheduler 1505 may perform task scheduling and task allocation depending on operations of the processor allocator 1400 and the processors 1510 to 1580.

Queues 1511, 1521, 1531, 1541, 1551, 1561, 1571, and 1581 may be provided corresponding to the respective processors 1510 to 1580. The queues 1511 to 1581 may manage lists of the tasks to be processed by the respective processors 1510 to 1580 depending on requests of the scheduler 1505.

The processors 1510 to 1580 may process the tasks allocated to the processors 1510 to 1580, with reference to the respective queues 1511 to 1581. The processors 1510 to

1580 may perform operations for processing the allocated tasks, based on data and information stored in the buffer 1600.

Figure 6:
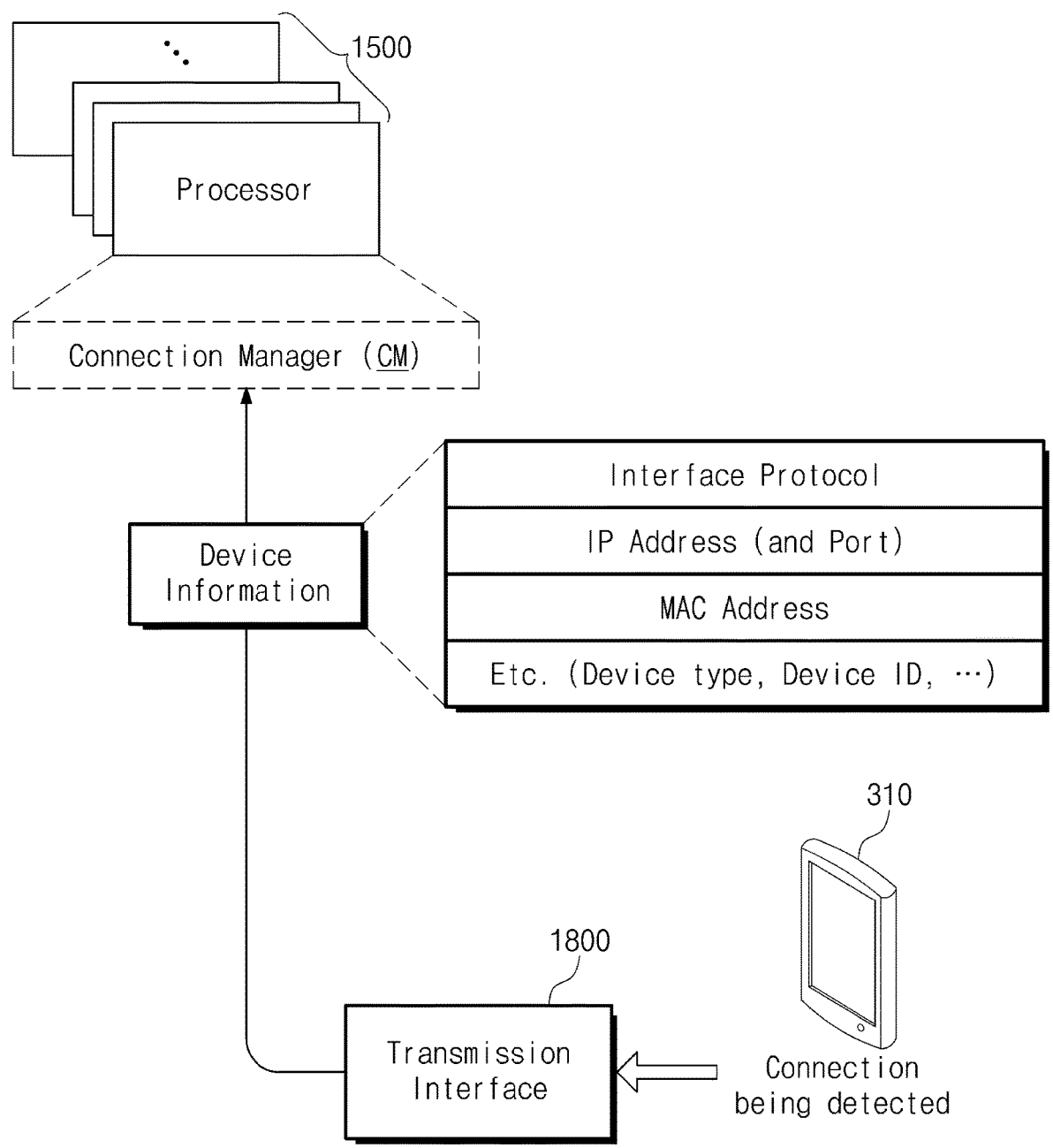
FIG. 6 is a conceptual diagram for describing an example operation of an electronic apparatus of FIG. 4.
Figure 7:
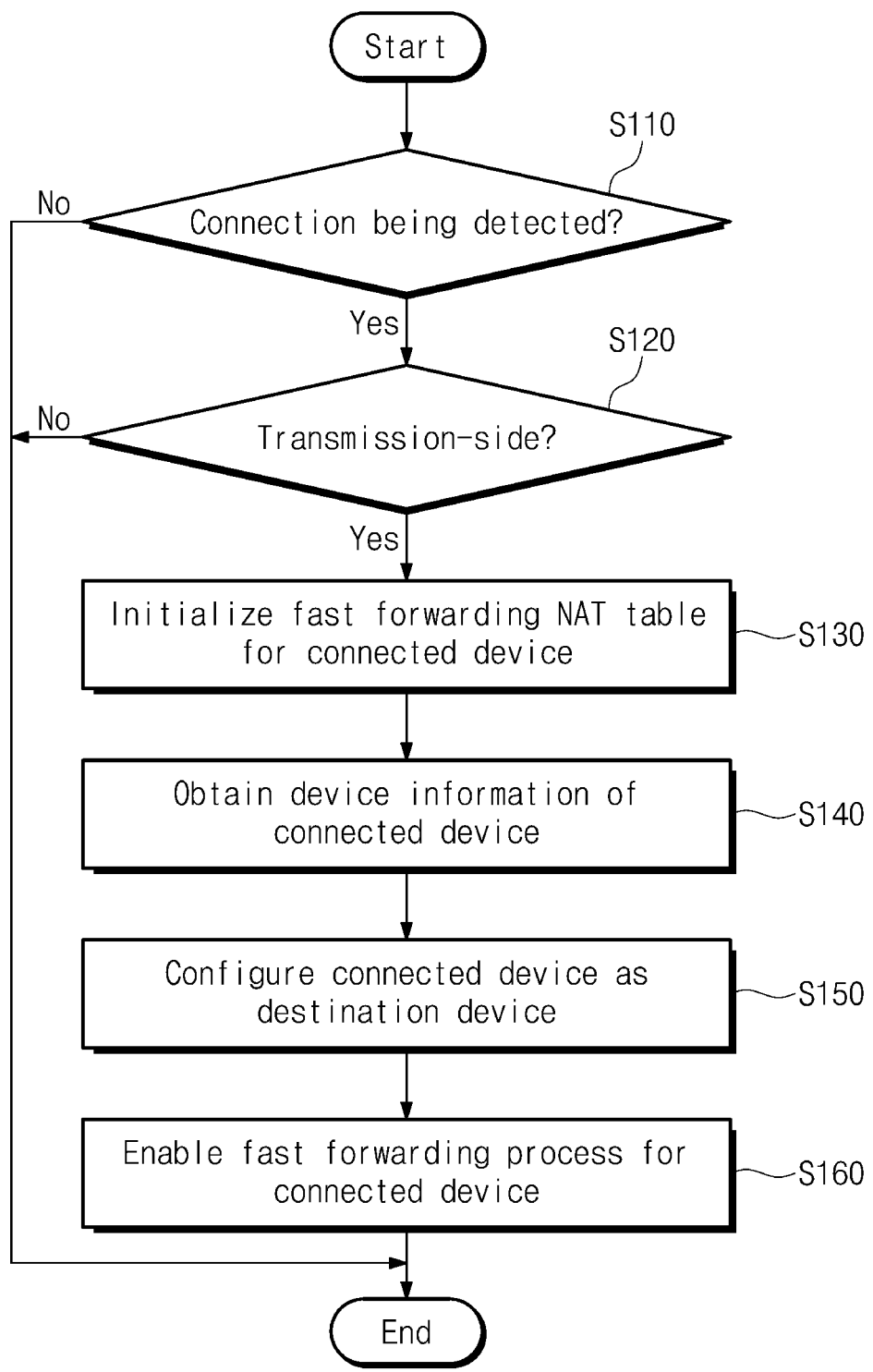
FIGS. 7 and 8 are flowcharts describing example operations of an electronic apparatus of FIG. 4.

FIG. 6 is a conceptual diagram for describing an example operation of the electronic apparatus 1000 of FIG. 4. FIG. 7 is a flowchart describing an example operation of the electronic apparatus 1000 of FIG. 4.

Referring to FIG. 6, a connection manager CM may be implemented in a program code executed by the processors 1500. As the connection manager CM is executed, the processors 1500 may detect whether a destination device (e.g., the electronic apparatus 310) is connected to the electronic apparatus 1000 via the transmission interface circuit 1800 (S110 of FIG. 7). When the destination device is not connected ('No' at S110 of FIG. 7), no further operation may be performed.

When the processors 1500 detects the connection ('Yes' at S110 of FIG. 7), the processors 1500 may determine whether the detected connection is associated with the transmission interface circuit 1800 (S120 of FIG. 7). For example, when the detected connection is not associated with the transmission interface circuit 1800 (e.g., when a connection to the reception interface circuit 110 is detected) ('No' at S120 of FIG. 7), no further operation may be performed.

When the processors 1500 detects that a device is connected via the transmission interface circuit 1800 ('Yes' at S120 of FIG. 7), the processor 1500 may initialize the fast forwarding NAT table 1300 with regard to the connected device. In the initialization, the processors 1500 may request the fast forwarding NAT table 1300 to remove a previous entry stored in the fast forwarding NAT table 1300.

The processors 1500 may obtain device information of the connected device (S140 of FIG. 7). For example, the device information may include information of an interface protocol (e.g., USB, Wi-Fi, and/or the like) which supports communication between the connected device and the transmission interface circuit 1800. The device information may include information of an internal configuration of the connected device (e.g., an IP address and a port of the connected device, a media access control (MAC) address of the connected device, and/or the like).

Besides, the device information may include information (e.g., a device type, a device identifier, and/or the like) referenced to identify the connected device. The device information may be stored in the buffer 1600 and/or another memory accessible by the processors 1500.

The processors 1500 may configure the connected device as the destination device (S150 of FIG. 7). Thus, the processors 1500 may operate to forward a packet, which is received from a source device, to the destination device. In addition, the processors 1500 may enable the fast forwarding process PFF for the connected destination device (S160 of FIG. 7).

Figure 8:
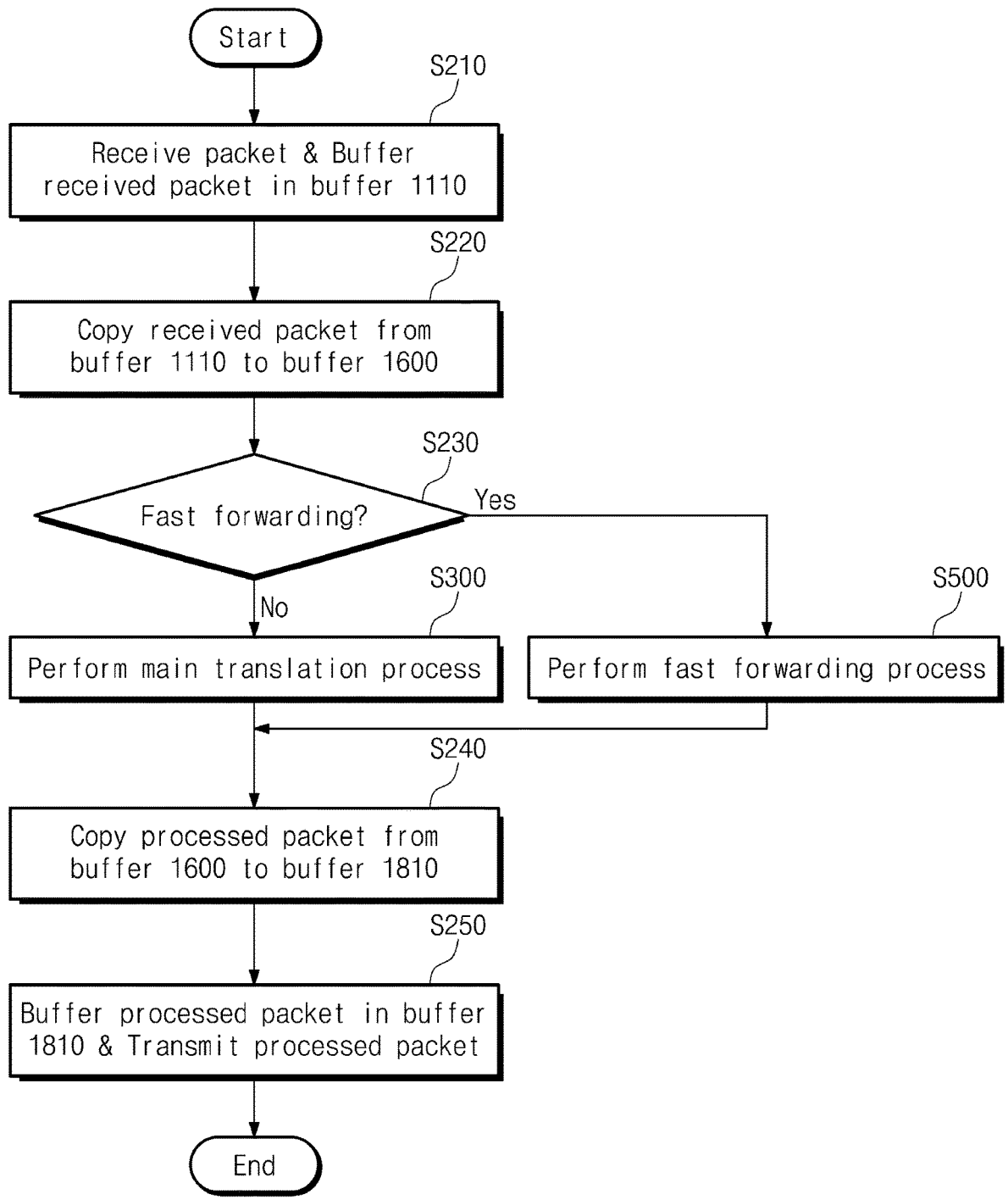

FIG. 8 is a flowchart describing an example operation of the electronic apparatus 1000 of FIG. 4.

After the source device is connected to the electronic apparatus 1000 via the reception interface circuit 1100 (and the network 130) and the destination device is connected to the electronic apparatus 1000 via the transmission interface circuit 1800, communication between the source device and the destination device may be performed via the electronic apparatus 1000. The reception interface circuit 1100 may receive the packet RPK transferred from the source device, and may buffer the packet RPK in the buffer 1110 (S210).

In response to receiving the packet RPK, an interrupt for processing packet reception may occur. In response to the interrupt, the packet RPK may be copied or moved from the buffer 1110 to the buffer 1600 (S220). Alternatively, in some cases, the packet RPK in the buffer 1110 may be accessible by the processors 1500 without copying or moving the packet RPK.

The fast forwarding manager 1200 may determine whether fast forwarding is required with regard to the packet RPK, with reference to the fast forwarding NAT table 1300 (S230). When the fast forwarding is not required ('No' at S230), the processors 1500 may perform the main translation process PMT (S300).

When the fast forwarding is available ('Yes' at S230), the processors 1500 may perform the fast forwarding process PFF without the main translation process PMT (S500). As will be described below, the fast forwarding manager 1200 may perform pre-processing on the packet RPK in advance before processing the packet RPK is allocated to the processors 1500, to provide fast address translation. Thus, the main translation process PMT may not be required.

As the main translation process PMT or the fast forwarding process PFF is performed, the processors 1500 may process the packet RPK to generate the packet TPK to be output to the destination device. The buffer 1600 may temporarily store the processed packet TPK. The processors 1500 may cause an interrupt to copy or move the packet TPK of the buffer 1600 to the buffer 1810 (S240).

The transmission interface circuit 1800 may buffer the packet TPK in the buffer 1810, and may output the packet TPK to the destination device. Thus, the packet may be transferred from the source device to the destination device via the electronic apparatus 1000 (S250).

Figure 9:
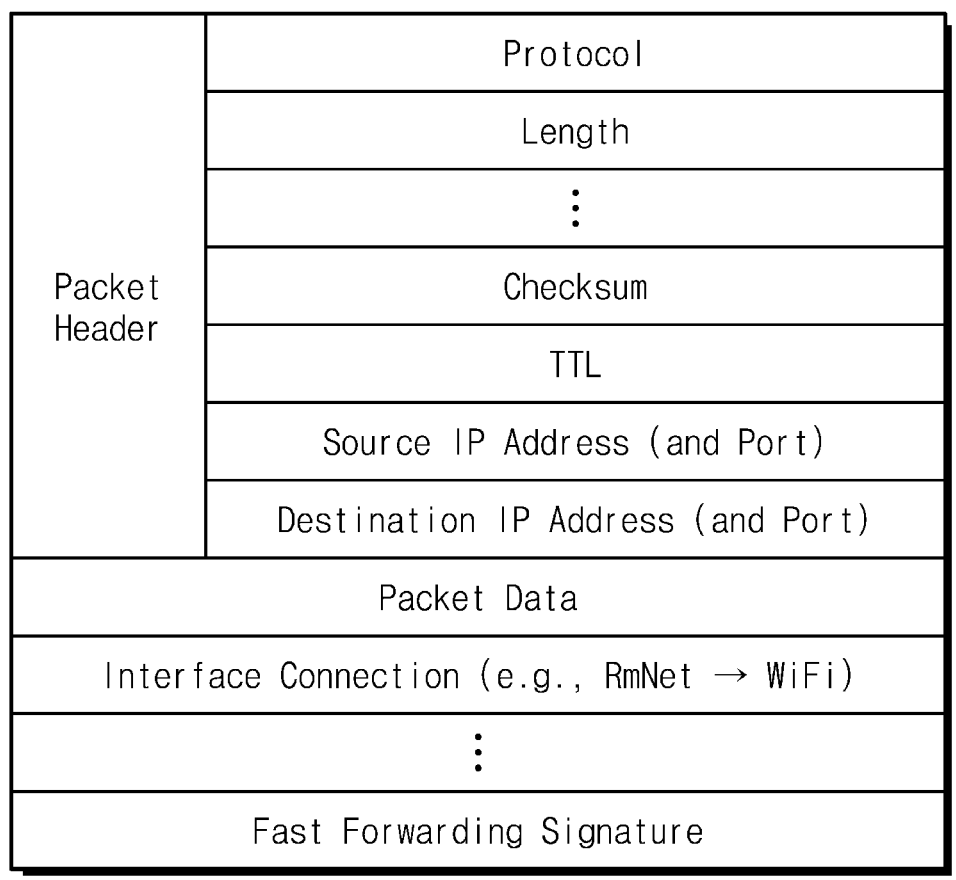
FIG. 9 is a conceptual diagram illustrating an example configuration of information stored in a buffer of FIG. 4.

FIG. 9 is a conceptual diagram illustrating an example configuration of information stored in the buffer 1600 of FIG. 4.

The buffer 1600 may store a header of a packet and data. For example, the header of the packet may include information associated with a kind of a communication protocol for transferring the packet, a length of the packet, a checksum referenced to check a packet error, a time-to-live (TTL) of the packet, and/or the like. In addition, the header of the packet may include information associated with an IP address and a port of a source device, and an IP address and a port of a destination device. Besides, the header of the packet may include a variety of information referenced to communicate the packet.

The buffer 1600 may store data intended to be transferred through the packet.

The buffer 1600 may include information associated with interface protocols supported by the reception interface circuit 1100 and the transmission interface circuit 1800. For example, the buffer 1600 may include information of interface protocols associated with receiving the packet RPK at the reception interface circuit 1100 and outputting the packet TPK from the transmission interface circuit 1800 (e.g., the packet RPK is received in compliance with an RmNet interface protocol, and the packet TPK is output in compliance with a Wi-Fi interface protocol). Thus, the packet may accompany information of kinds of interface protocols associated with receiving and outputting the packet.

The buffer 1600 may store a signature of fast forwarding. When the packet is transferred through the fast address translation and the fast forwarding process PFF, the buffer 1600 may store the signature corresponding to the packet. The processors 1500 may determine that the packet requires the fast forwarding process PFF, with reference to the signature. This will be described in detail below.

For example, the signature may include bits for indicating the fast forwarding process PFF. For example, the signature may be stored in a reserved area or a callback area. Alternatively, for example, the signature may be included in a reserved field of the header of the packet. The disclosure is not limited thereto, and the configuration of the signature may be variously changed or modified to request the processors 1500 to perform the fast forwarding process PFF.

Figure 10:
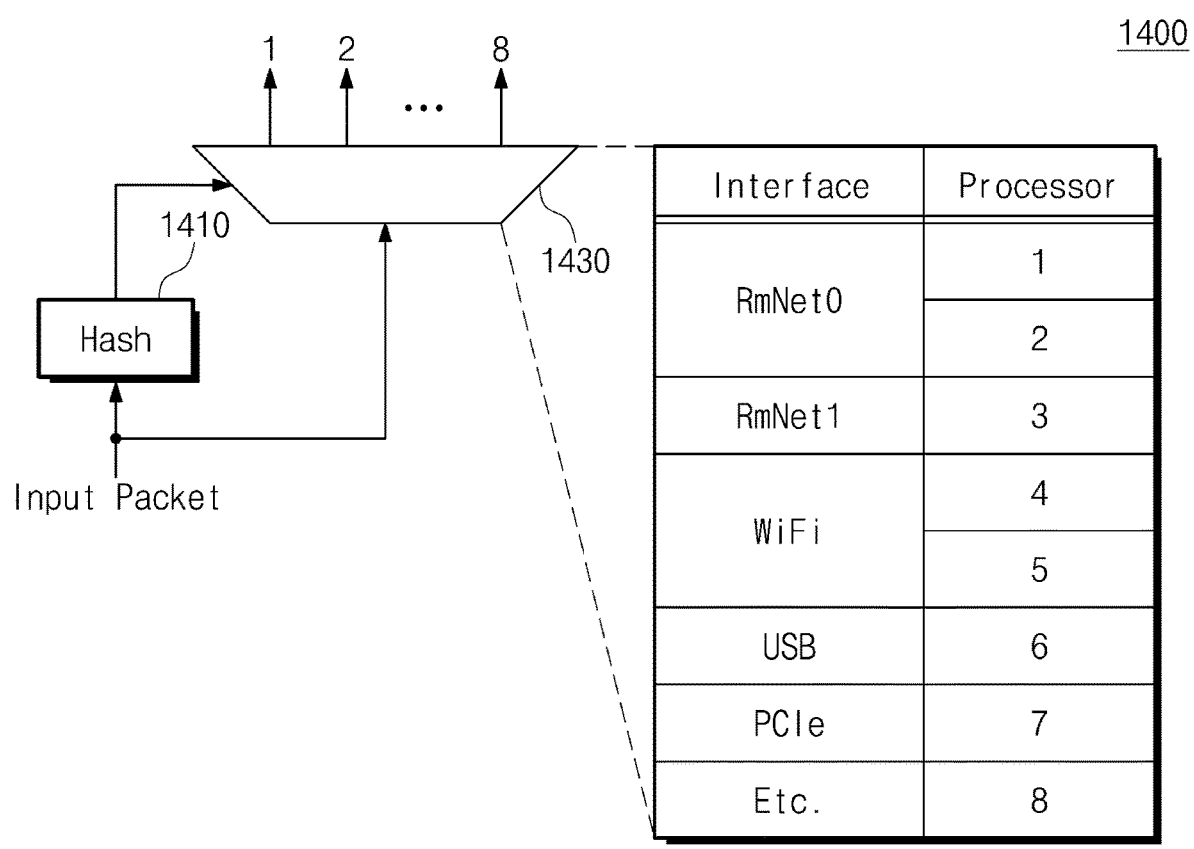
FIG. 10 is a conceptual diagram illustrating an example configuration of a processor allocator of FIG. 4.

FIG. 10 is a conceptual diagram illustrating an example configuration of the processor allocator 1400 of FIG. 4.

The processor allocator 1400 may include a hash module 1410 and a selector 1430. A packet to be processed by the processors 1500 may be input to the hash module 1410 and the selector 1430. For example, the packet may be input from the reception interface circuit 1100 or the buffer 1600 to the processor allocator 1400.

The hash module 1410 may perform a hash operation on the received packet. The packet may accompany information of kinds of interface protocols associated with receiving and outputting the packet. The hash module 1410 may perform the hash operation on a value indicating one of the kinds of the interface protocols.

The selector 1430 may select a processor which is to process the received packet among the processors 1500, based on a result of the hash operation. Thus, the processor which is to process the received packet may be selected based on a kind of an interface protocol supported by the reception interface circuit 1100 or the transmission interface circuit 1800.

The selector 1430 may output the received packet, based on the result of the hash operation, such that the received packet is allocated to the selected processor. As the processor allocator 1400 outputs the packet from the selector 1430, the scheduler 1505 may queue a task in a queue corresponding to the selected processor, such that the selected processor processes the packet.

For example, when the interface protocol for receiving or outputting the packet is RmNet, processing the packet may be allocated to one of the processors 1510, 1520, and 1530. Likewise, when the interface protocol for receiving or outputting the packet is Wi-Fi, USB, PCIe, or another protocol, processing the packet may be allocated to the processor 1540, the processor 1550, the processor 1560, the processor 1570, or the processor 1580. This example is provided to facilitate better understanding, and is not intended to limit the disclosure.

The processor allocator 1400 may include hardware circuits (e.g., an analog circuit, a logic circuit, and/or the like) configured to perform operations described in the disclosure. For example, the hash module 1410 may include a logic circuit configured to perform a hash operation, and the selector 1430 may include a demultiplexer configured to provide an output path corresponding to the result of the hash operation. Alternatively, in some cases, some operations of the hash module 1410 and the selector 1403 may be implemented in a program code of software and/or firmware executed by a processor.

Figure 11:
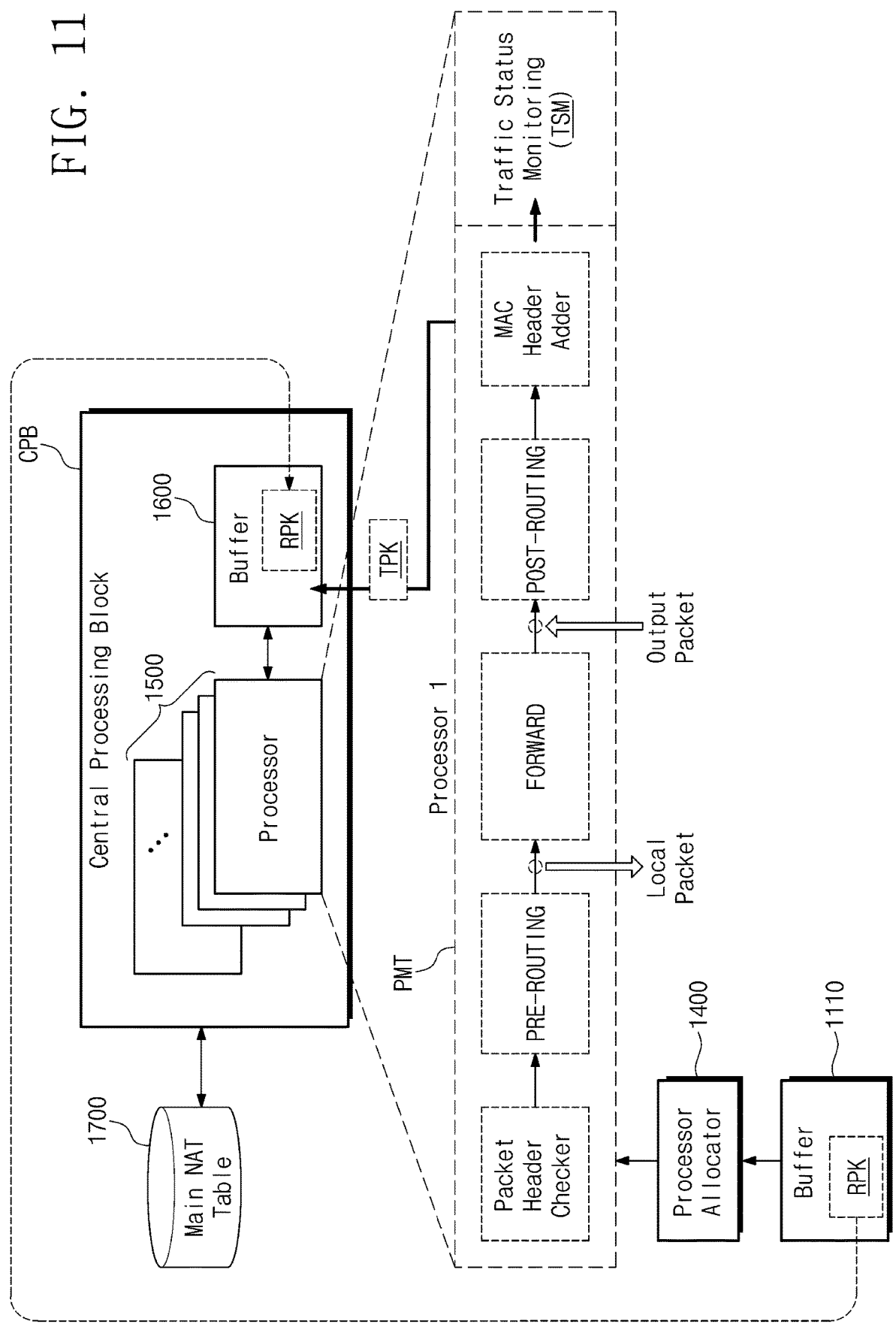
FIG. 11 is a conceptual diagram for describing an example operation associated with a main translation process of an electronic apparatus of FIG. 4.
Figure 13:
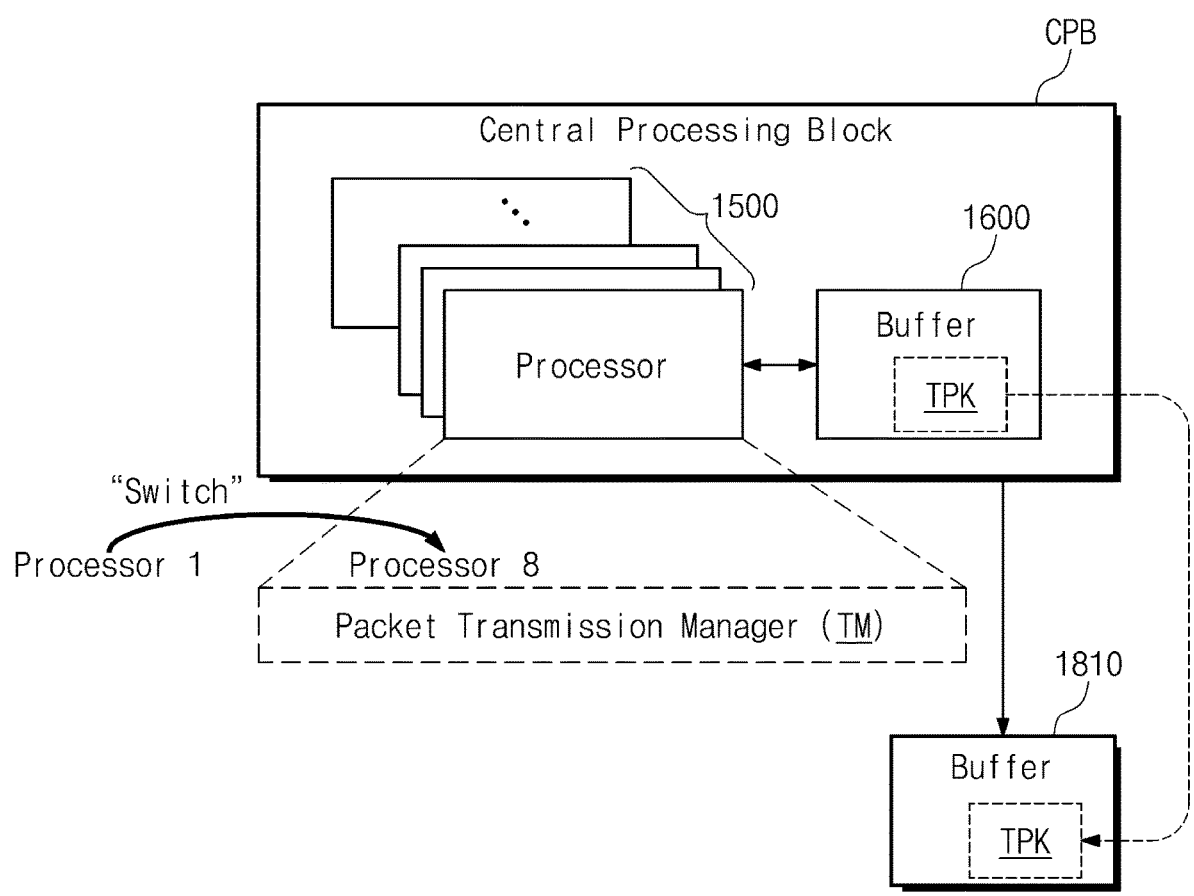
FIG. 13 is a conceptual diagram for describing an example operation associated with a main translation process of an electronic apparatus of FIG. 4.
Figure 14:
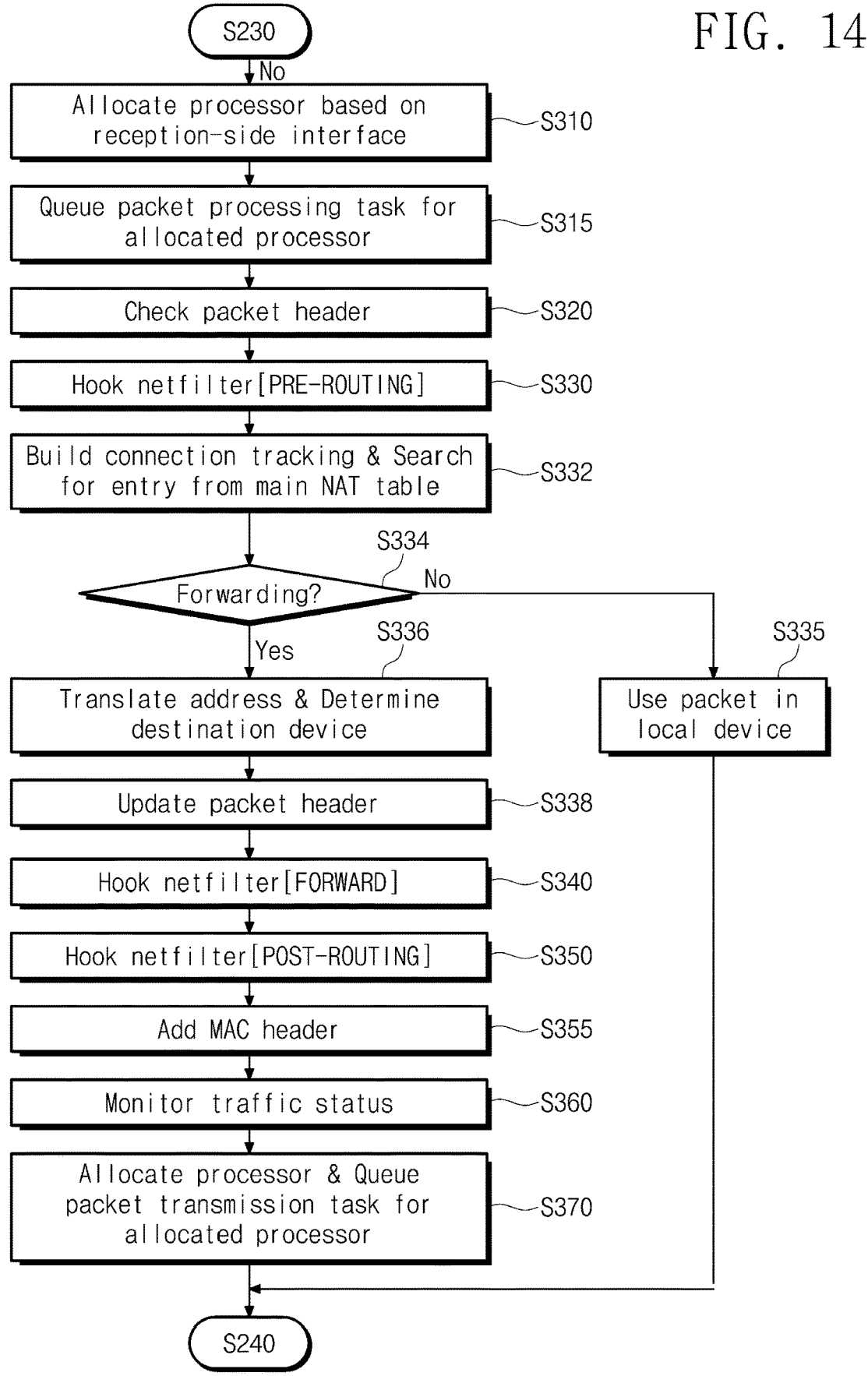
FIG. 14 is a flowchart describing an example operation associated with a main translation process of an electronic apparatus of FIG. 4.

FIGS. 11 and 13 are conceptual diagrams for describing example operations associated with the main translation process PMT of the electronic apparatus 1000 of FIG. 4. FIG. 12 is a conceptual diagram illustrating an example configuration of information stored in the main NAT table 1700 of FIG. 4. FIG. 14 is a flowchart describing an example operation associated with the main translation process PMT of the electronic apparatus 1000 of FIG. 4.

Referring to FIGS. 8 and 11, the reception interface circuit 1100 may receive the packet RPK from a source device (S210 of FIG. 8). The packet RPK may include a first address (e.g., an internal source IP address described below)

as an IP address of the source device. The packet RPK buffered in the buffer 1110 may be copied or moved to the buffer 1600 (S220 of FIG. 8).

In earlier communication after communication between the source device and a destination device is initiated, a condition for performing the fast forwarding process PFF may not be satisfied yet ('No' at S230 of FIG. 8), and the packet RPK may be received before the condition is satisfied. Thus, in earlier communication, the main translation process PMT may be performed with regard to the packet RPK (S300 of FIG. 8). Operation S300 of FIG. 8 may include operations S310 to S370 of FIG. 14.

Referring back to FIGS. 11 and 14, the processor allocator 1400 may allocate a processor which is to process the received packet RPK among processors 1500. Network address translation is not performed yet, and in this regard, the processor allocator 1400 may select a processor based on a kind of an interface protocol associated with receiving the packet RPK (e.g., an interface protocol supported by the reception interface circuit 1100) (S310 of FIG. 14). For example, when the packet RPK is received in compliance with an RmNet interface protocol at the reception interface circuit 1100, processing the packet RPK may be allocated to the processor 1510 of FIG. 5 (refer to FIG. 10). It should be noted that the processor 1510 among the processors 1510 to 1580 in FIG. 5 is described as performing operations in the example embodiments below, but this is merely exemplary and does not limit the disclosure. The operations associated with the main translation process PMT according to example embodiments may be performed by any one of the processors 1500 in FIG. 5.

As the processor allocator 1400 and the scheduler 1505 operate, a task associated with processing the packet RPK may be queued in the queue 1511 corresponding to the processor 1510 (S315 of FIG. 14). The processor 1510 may start the main translation process PMT to perform network address translation for the packet RPK.

First, the processor 1510 may check a header of the packet RPK (S320 of FIG. 14). For example, the processor 1510 may check whether there is no error in the packet RPK, whether data of the packet RPK is lost, whether an order of the packet RPK is appropriate, and/or the like.

Next, the processor 1510 may hook filters associated with translating an address of the packet RPK. For example, when a Linux kernel is run on the processors 1500, a pre-routing filter, a forward filter, and a post-routing filter of a netfilter may be hooked in the processors 1500.

The pre-routing filter, the forward filter, and the post-routing filter may process (e.g., route, forward, or drop) the packet RPK with reference to information of the main NAT table 1700 based on rules defined in the respective filters. However, this example is provided to facilitate better understanding, and is not intended to limit the disclosure. The hooked filter, function, or procedure may be variously changed or modified depending on an operation condition of the processors 1500.

For example, the pre-routing filter may be hooked in the processor 1510 (S330 of FIG. 14), and the packet RPK may be processed based on rules defined in the pre-routing filter. The processor 1510 may build connection tracking with regard to the packet RPK, and may search for an entry corresponding to the packet RPK from the main NAT table 1700 (S332 of FIG. 14).

Referring to FIG. 12, for example, the main NAT table 1700 may store information of an internal source IP address, an internal source port, an external source port, an external source IP address, a destination IP address, and a destination port. These addresses and ports may be managed to correspond or be mapped to each other in one entry. The main NAT table 1700 may store the information irrespective of a condition for performing the fast forwarding process PFF.

The main NAT table 1700 may be implemented in a hardware module configured to store the addresses and the ports based on a correspondence relationship or a mapping relationship and to output requested information to the processors 1500. Alternatively, some or all pieces of the information of the main NAT table 1700 may be inserted into a program code executed by the processors 1500 and may be stored in a memory (e.g., the buffer 1600).

Referring back to FIG. 11, the processor 1510 of FIG. 5 may search for the main NAT table 1700 to determine whether a destination IP address corresponding to an internal source IP address of the packet RPK is a local address of the electronic apparatus 1000. Thus, the processor 1510 may determine whether to forward the packet RPK for a destination device (S334 of FIG. 14). When the packet RPK is not to be forwarded (e.g., when the destination IP address is the local address) ('No' at S334 of FIG. 14), the processor 1510 may use the packet RPK in the electronic apparatus 1000 (S335 of FIG. 14).

When the packet RPK is to be forwarded (e.g., when the destination IP address is not the local address) ('Yes' at S334 of FIG. 14), the processor 1510 may perform the network address translation for the packet RPK and may determine the destination device (S336 of FIG. 14).

The processor 1510 may translate a first address (e.g., an internal source IP address) of the packet RPK to a second address (e.g., an external source IP address) with reference to the main NAT table 1700. For example, referring to FIG. 12, when the packet RPK includes an internal source IP address of "192.168.0.3" and an internal source port of "60000", the processor 1510 may translate the internal source IP address and the internal source port of the packet RPK to an external source IP address of "1.1.1.1" and an external source port of "50003".

Referring back to FIG. 11, in response to the network address being translated, the processor 1510 may update the header of the packet RPK (S338 of FIG. 14). The forward filter and the post-routing filter may be hooked in the processor 1510 (S340 and S350 of FIG. 14), and the packet RPK may be processed based on rules defined in the forward filter and the post-routing filter. A packet output from the electronic apparatus 1000 to the destination device may also be processed by the post-routing filter.

The processor 1510 may add an MAC header to the packet RPK (S355 of FIG. 14). The MAC header may include information such as an MAC address of the destination device. For example, the processor 1510 may generate the MAC header with reference to the device information obtained in response to the connection of the destination device (refer to FIG. 6).

Based on processing of the packet RPK by the processor 1510 through operations S320 to S355 of FIG. 14 including the network address translation, the packet TPK to be output to the destination device may be prepared. The packet TPK may be buffered in the buffer 1600. The packet TPK in the buffer 1600 may include the second address translated from the first address.

Traffic status monitoring TSM may be implemented in a program code executed by the processors 1500. In response to execution of the traffic status monitoring TSM, the processor 1510 may monitor a traffic status for packets (including the packet TPK) of which each includes the second address (S360 of FIG. 14). For example, the processor 1510 may monitor various statuses such as the number of packets, the whole amount of data of the packets, a bandwidth required for outputting the packets, errors of the packets, a communication error, and/or the like.

Referring to FIG. 13, the processor 1510 may select a processor which is to process outputting the packet TPK of the buffer 1600 among the processors 1500. The processor which is to process outputting the packet TPK may be fixed, or may be selected among one or more idle or available processors. Additionally, the processor which is to process outputting the packet TPK may be selected depending on various conditions.

For example, the processor 1580 may be selected to process outputting the packet TPK. In this case, switching from the processor 1510 to the processor 1580 may occur, such that the processor 1580 processes outputting the packet TPK including the second address to the destination device. In response to the processor 1580 being allocated, a task associated with outputting the packet TPK may be queued in the queue 1581 corresponding to the processor 1580 (S370 of FIG. 14).

A packet transmission manager TM may be implemented in a program code executed by the processors 1500. An interrupt may occur to allocate the processor 1580, and the processor 1580 may execute the packet transmission manager TM in response to the interrupt. In response to execution of the packet transmission manager TM, the processor 1580 may copy or move the packet TPK buffered in the buffer 1600 to the buffer 1810 (S240 of FIG. 8).

The transmission interface circuit 1800 may output the packet TPK including the second address to the destination device (S250 of FIG. 8). The main translation process PMT described with reference to FIG. 8 and FIGS. 11 to 14 may be continued while one or more packets are received before the condition for performing the fast forwarding process PFF is satisfied.

Figure 15:
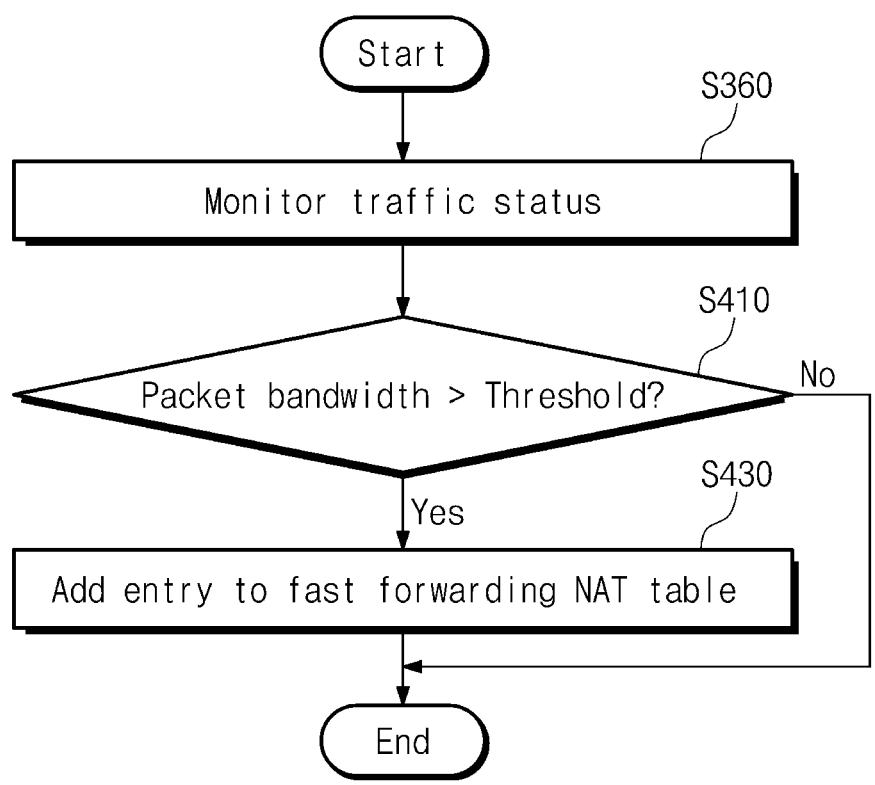
FIG. 15 is a flowchart describing an example operation of an electronic apparatus of FIG. 4.

FIG. 15 is a flowchart describing an example operation of the electronic apparatus 1000 of FIG. 4.

In the example described above, the processor 1510 may monitor the traffic status for packets of which each includes the second address. The processor 1510 may determine the condition for performing the fast forwarding process PFF, based on the monitored traffic status. For example, the condition for performing the fast forwarding process PFF may be satisfied when a bandwidth required for outputting the packets becomes greater than a reference value or a threshold.

In this regard, the processor 1510 may determine whether the monitored bandwidth is greater than the reference value or the threshold (S410). When the monitored bandwidth is not greater than the reference value or the threshold ('No' at S410), the fast forwarding process PFF may not be performed.

When the monitored bandwidth becomes greater than the reference value or the threshold while the packets are communicated ('Yes' at S410), the fast forwarding process PFF may be triggered. To this end, the processor 1510 may add an entry associated with the packets to the fast forwarding NAT table 1300 (S430). The fast forwarding NAT table 1300 will be described with reference to FIG. 16.

The disclosure is not limited to the above example, and the condition for performing the fast forwarding process PFF may be variously changed or modified. For example, the condition for performing the fast forwarding process PFF may be satisfied when the number of the packets becomes greater than a reference number or when the wholly accumulated amount of data of the packets becomes greater than a reference amount. For example, the condition for performing the fast forwarding process PFF may be satisfied when the packets have high priorities or when fast processing for the packets is required (e.g., when the packets are associated with a security issue or system management). For example, the condition for performing the fast forwarding process PFF may be satisfied in response to a request of a user or a request on an operation policy. Operation S410 may be variously changed or modified depending on the condition for performing the fast forwarding process PFF.

FIG. 16 is a conceptual diagram illustrating an example configuration of information stored in the fast forwarding NAT table 1300 of FIG. 4.

The fast forwarding NAT table 1300 may store information of addresses and ports based on the main NAT table 1700. For example, the fast forwarding NAT table 1300 may store information of an internal source IP address, an internal source port, an external source port, an external source IP address, a destination IP address, and a destination port. These addresses and ports may be managed to correspond or be mapped to each other in one entry.

In some example embodiments, the fast forwarding NAT table 1300 may manage the information of the addresses and the ports in correspondence with some or all pieces of the device information of the destination device. For example, an MAC address of the destination device may be managed corresponding to the addresses and the ports in the fast forwarding NAT table 1300.

The information of the fast forwarding NAT table 1300 may be stored when the condition for performing the fast forwarding process PFF is satisfied. For example, referring to FIG. 16, while packets are communicated from a source device, which has an internal source IP address of "192.168.0.3" and an internal source port of "60000", to a destination device which has a destination IP address of "3.3.3.3" and a destination port of "30001", a communication bandwidth may become greater than a reference value. In this case, under control of the processors 1500, information of related addresses and ports may be provided from the main NAT table 1700 to the fast forwarding NAT table 1300. In addition, under control of the processors 1500, the device information of the destination device may be provided from the buffer 1600 to the fast forwarding NAT table 1300.

An entry stored in the fast forwarding NAT table 1300 may mean that communication corresponding to the entry is frequently performed or accompanies a large amount of data, and thus needs high communication performance. To achieve the high communication performance, the fast forwarding NAT table 1300 may be prepared in advance so that the fast forwarding NAT table 130 may be referenced by the fast forwarding manager 1200 before the main NAT table 1700 is referenced by the processors 1500.

The fast forwarding NAT table 1300 may be implemented in a hardware module configured to store the addresses and the ports based on a correspondence relationship or a mapping relationship and to output requested information to the fast forwarding manager 1200. Alternatively, some or all pieces of the information of the fast forwarding NAT table 1300 may be inserted into a program code executed by a processor and may be stored in a memory.

Figure 17:
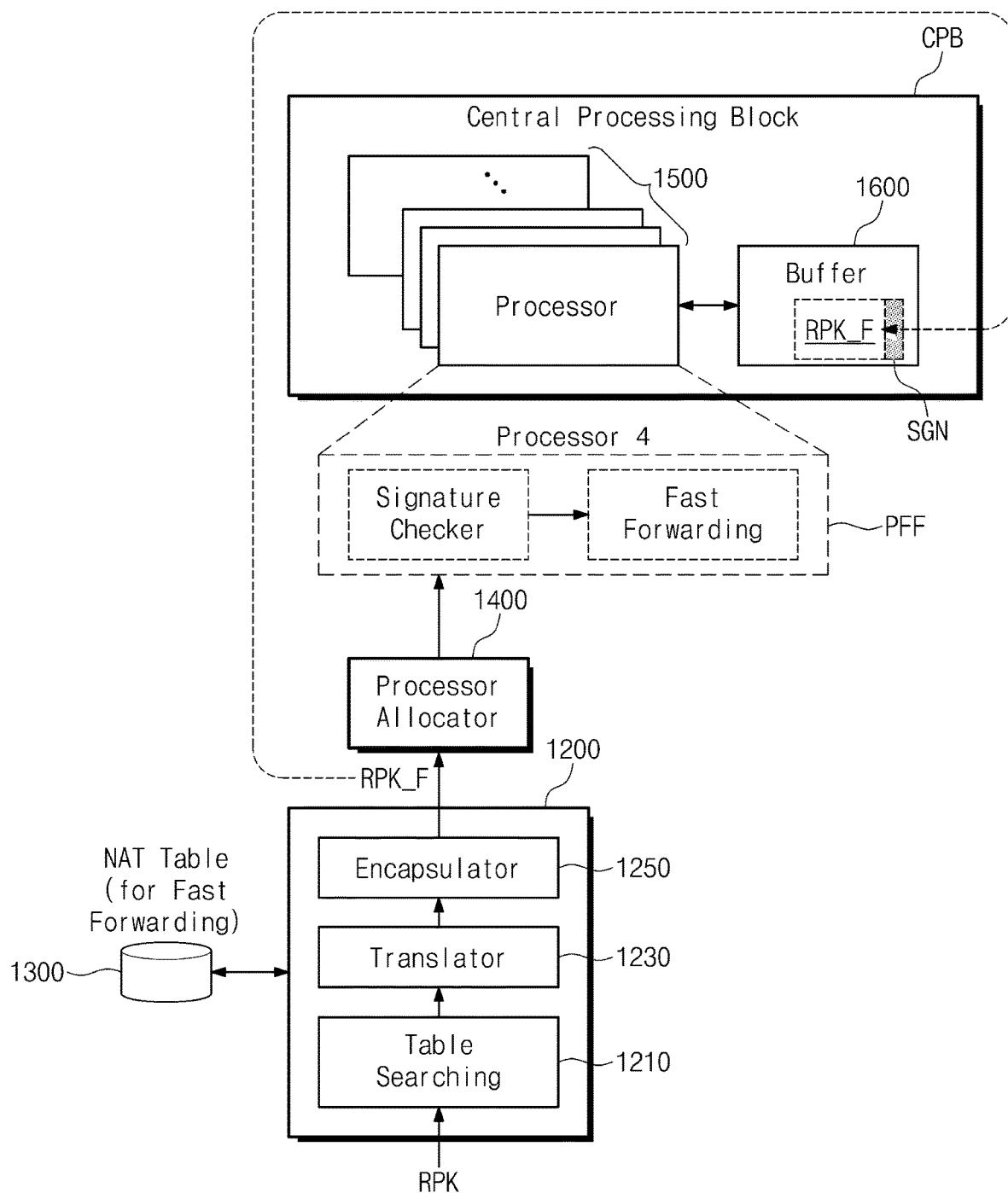
FIGS. 17 and 18 are conceptual diagrams for describing example operations associated with a fast forwarding process of an electronic apparatus of FIG. 4.
Figure 18:
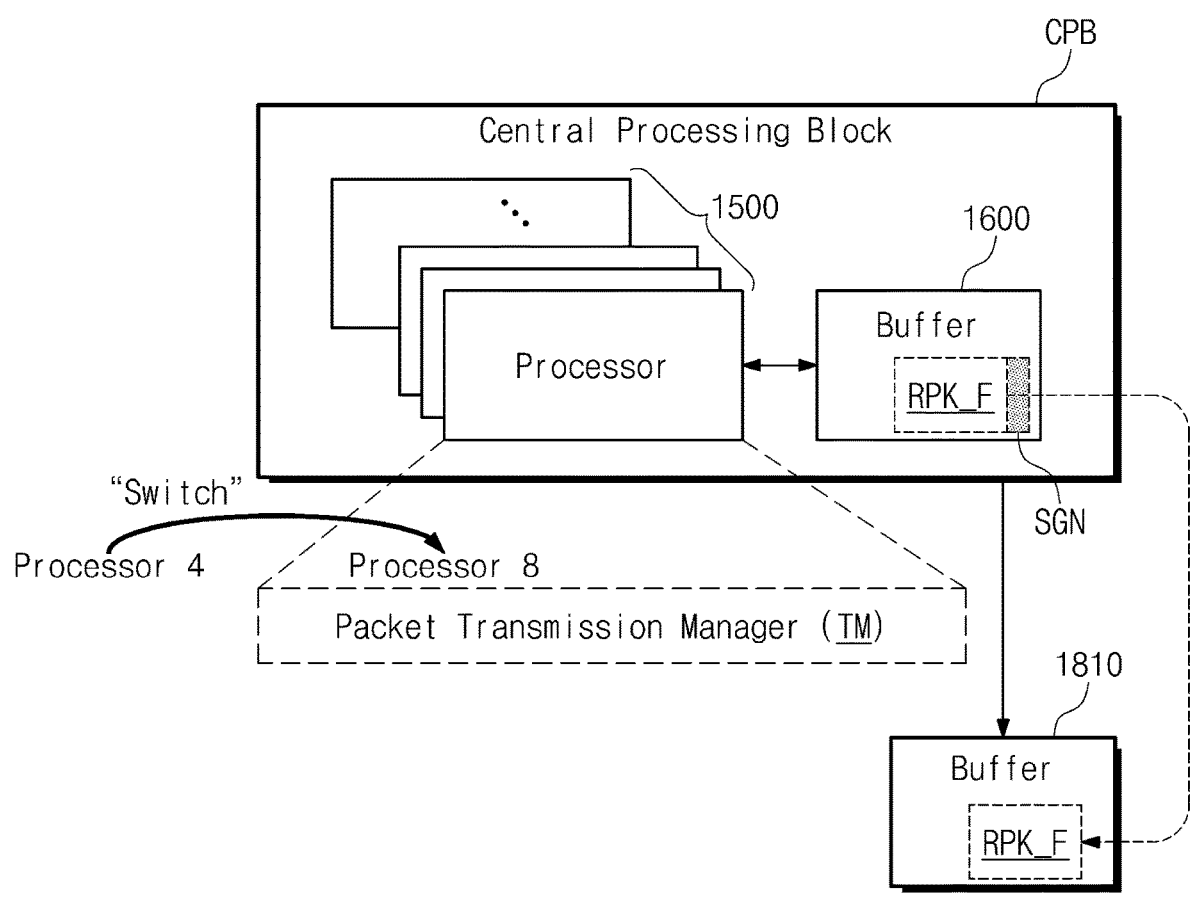
Figure 19:
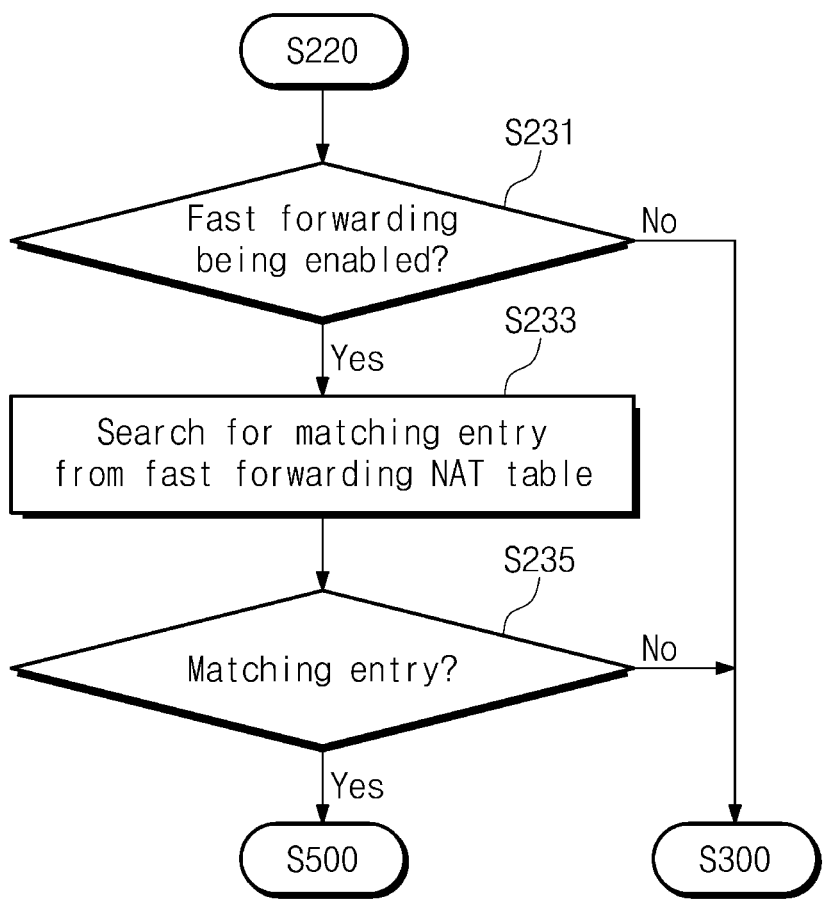
FIGS. 19 and 20 are flowcharts describing example operations associated with a fast forwarding process of an electronic apparatus of FIG. 4.
Figure 20:
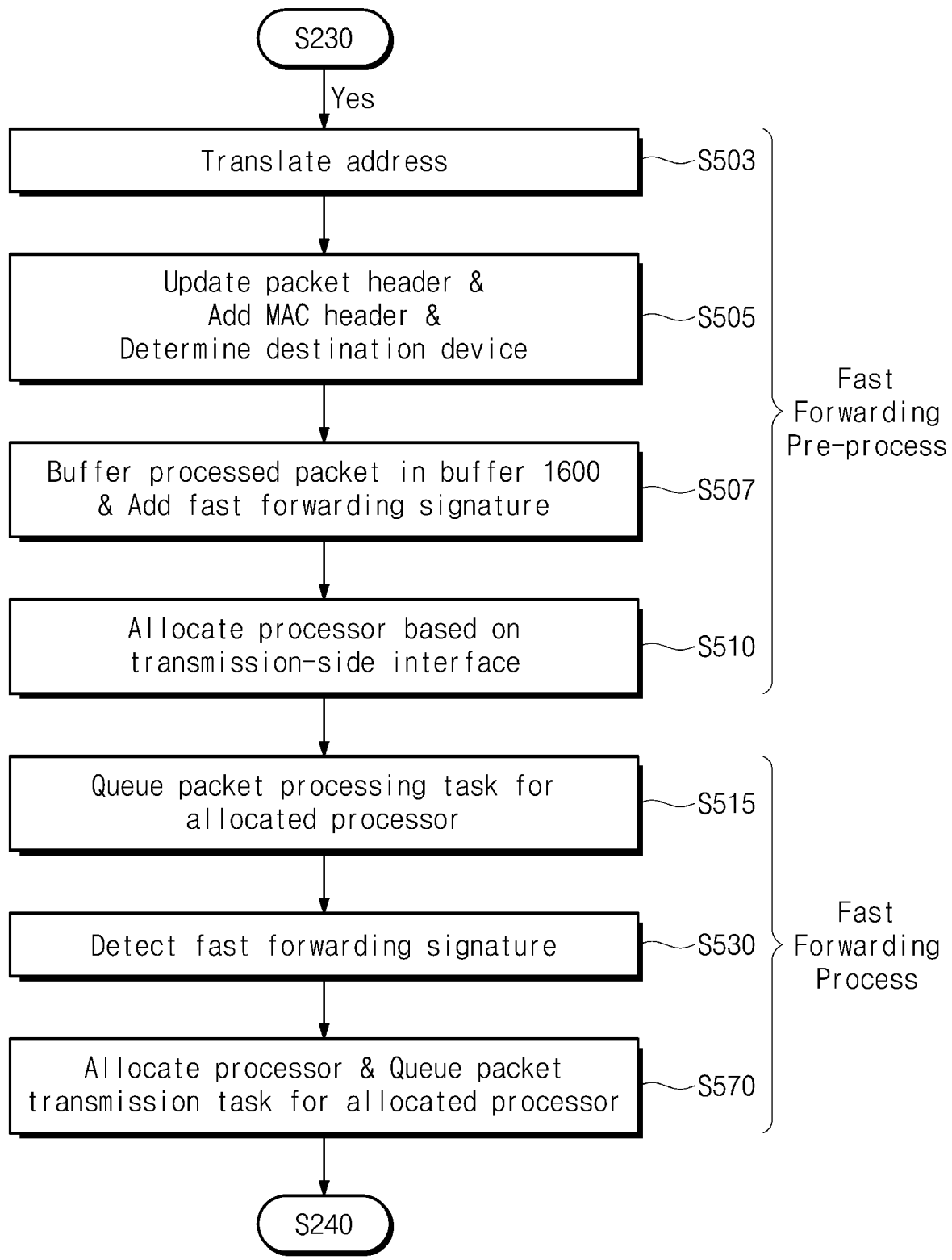

FIGS. 17 and 18 are conceptual diagrams for describing example operations associated with the fast forwarding process PFF of the electronic apparatus 1000 of FIG. 4. FIGS. 19 and 20 are flowcharts describing example operations associated with the fast forwarding process PFF of the electronic apparatus 1000 of FIG. 4.

Referring to FIGS. 8 and 17, similar to the main translation process PMT, the reception interface circuit 1100 may receive the packet RPK from a source device (S210 of FIG. 8). The packet RPK may include a first address (e.g., an internal source IP address) as an IP address of the source device. The packet RPK may be provided to the fast forwarding manager 1200.

In some example embodiments, the fast forwarding manager 1200 may include a table searcher 1210, a translator 1230, and an encapsulator 1250. The fast forwarding manager 1200 may include hardware circuits (e.g., an analog circuit, a logic circuit, and/or the like) configured to perform operations described below. Alternatively, in example embodiments, some operations of the fast forwarding manager 1200 may be implemented in a program code of software and/or firmware executed by a processor.

Operation S230 of FIG. 8 may include operations S231 to S235 of FIG. 19. The fast forwarding manager 1200 may determine whether the fast forwarding process PFF is enabled (S231 of FIG. 19). When the fast forwarding process PFF is not enabled ('No' at S231 of FIG. 19), the main translation process PMT may be performed (S300 of FIG. 8).

When the fast forwarding process PFF is enabled ('Yes' at S231 of FIG. 19), the table searcher 1210 may search for the fast forwarding NAT table 1300 to determine whether an entry matching with the first address of the packet RPK has been stored in the fast forwarding NAT table 1300 (S233 of FIG. 19). When there is no matching entry in the fast forwarding NAT table 1300 ('No' at S235 of FIG. 19), the main translation process PMT may be performed (S300 of FIG. 8).

When there is the matching entry in the fast forwarding NAT table 1300 ('Yes' at S235 of FIG. 19), the fast forwarding process PFF may be performed (S500 of FIG. 8). For example, before the packet RPK including an internal source IP address of "192.168.0.3" is received, the condition for performing the fast forwarding process PFF may be satisfied. In this case, the packet RPK may be received after the fast forwarding NAT table 1300 stores the entry matching with the packet RPK (refer to FIG. 16). Operation S500 of FIG. 8 may include a fast forwarding pre-process of operations S503 to S510 of FIG. 20 and a fast forwarding process PFF of operations S515 to S570 of FIG. 20.

Referring back to FIG. 17, the translator 1230 may translate the first address of the packet RPK to a second address (e.g., an external source IP address) with reference to the fast forwarding NAT table 1300 (S503 of FIG. 20). As the network address is translated, the encapsulator 1250 may update a header of the packet RPK. In addition, the encapsulator 1250 may add an MAC header to the packet RPK with reference to the fast forwarding NAT table 1300 (or the device information of the buffer 1600), and may determine a destination device for the packet RPK (S505 of FIG. 20).

The fast forwarding manager 1200 may perform the network address translation for the packet RPK with reference to the fast forwarding NAT table 1300. Thus, a packet RPK_F to be output to the destination device may be prepared. The packet RPK_F may correspond to the packet TPK of FIGS. 11 and 13. However, the packet RPK_F may be converted from the packet RPK by the fast forwarding manager 1200, rather than by the processors 1500.

The packet RPK_F may be buffered in the buffer 1600 (S507 of FIG. 20). The packet RPK_F in the buffer 1600 may include the second address translated from the first address by the fast forwarding manager 1200.

When the fast forwarding manager 1200 translates the first address of the packet RPK to the second address, the fast forwarding manager 1200 may generate a signature SGN to be referenced by the processors 1500. The signature SGN may indicate that the address of the packet RPK_F has already been translated from the first address to the second address. The signature SGN may be the signature of fast forwarding described with reference to FIG. 9.

When the buffer 1600 stores the packet RPK_F including the second address, the buffer 1600 may also store the signature SGN corresponding to the packet RPK_F (S507 of FIG. 20). The processors 1500 may determine, based on the signature SGN, that the network address translation for the packet RPK_F has already been completed and that the packet RPK_F is to be processed by using the fast forwarding process PFF.

The processor allocator 1400 may receive the packet RPK_F. The processor allocator 1400 may allocate a processor which is to process the packet RPK_F among the processors 1500. The network address translation may have already been completed, and thus the processor allocator 1400 may determine the destination device. In this regard, the processor allocator 1400 may select a processor based on a kind of an interface protocol associated with outputting the packet RPK_F (e.g., an interface protocol supported by the transmission interface circuit 1800) (S510 of FIG. 20).

For example, when the packet RPK_F is to be output in compliance with a Wi-Fi interface protocol from the transmission interface circuit 1800, processing the packet RPK_F may be allocated to the processor 1540 (refer to FIG. 10). The processor 1540 allocated after the fast forwarding manager 1200 completes the network address translation may not be associated with an interface protocol supported by the reception interface circuit 1100.

Based on operations of the processor allocator 1400 and the scheduler 1505, a task associated with processing the packet RPK_F may be queued in the queue 1541 corresponding to the processor 1540 (S515 of FIG. 20). The network address translation for the packet RPK_F may have been already performed before processing the packet RPK_F is allocated to the processor 1540. Thus, the processor 1540 may receive the packet RPK_F including the second address (e.g., from the buffer 1600), without translating the first address to the second address with regard to the packet RPK_F.

The processor 1540 may start the fast forwarding process PFF with regard to the packet RPK_F. The processor 1540 may check whether the signature SGN corresponding to the packet RPK_F is stored in the buffer 1600 (S530 of FIG. 20). Based on the signature SGN stored in the buffer 1600, the processor 1540 may process the packet RPK_F including the second address, such that the packet RPK_F is output to the destination device without additional address translation.

In other words, the processor 1540 may process to simply forward the packet RPK_F to the destination device. Thus, after the processor 1540 receives the packet RPK_F including the second address, filters associated with translating an address of a packet may not be hooked in the processors 1500 (or the processors 1500 may perform unhooking of filters associated with translating an address of a packet).

Referring to FIG. 18, the processor 1540 may select a processor which is to process outputting the packet RPK_F of the buffer 1600 among the processors 1500. The processor which is to process outputting the packet RPK_F may be fixed, or may be selected among one or more idle or available processors. Additionally, the processor which is to process outputting the packet RPK_F may be selected depending on various conditions.

For example, the processor 1580 may be selected to process outputting the packet RPK_F. In this case, switching from the processor 1540 to the processor 1580 may occur such that the processor 1580 processes outputting the packet RPK_F including the second address to the destination device. In response to the processor 1580 being allocated, a task associated with outputting the packet RPK_F may be queued in the queue 1581 corresponding to the processor 1580 (S570 of FIG. 20).

In response to execution of the packet transmission manager TM by the processor 1580, the processor 1580 may copy or move the packet RPK_F buffered in the buffer 1600 to the buffer 1810 (S240 of FIG. 8). The transmission interface circuit 1800 may output the packet RPK_F including the second address to the destination device (S250 of FIG. 8).

When the fast forwarding manager 1200 performs the fast forwarding pre-process to process the network address translation, the processor 1580 may process outputting the packet RPK_F without network address translation of the main translation process PMT. The fast forwarding process PFF described with reference to FIGS. 8 and 17 to 20 may continue to be performed with respect to one or more packets that are received when the condition for performing the fast forwarding process PFF is satisfied.

The fast forwarding NAT table 1300 may include entries that are added in response to the condition for performing the fast forwarding process PFF being satisfied. Thus, a size of the fast forwarding NAT table 1300 may be smaller than a size of the main NAT table 1700. For example, when the fast forwarding NAT table 1300 has the same size as the size of the main NAT table 1700, overhead may increase due to two duplicated tables 1300 and 1700. In an exemplary embodiment, the number of entries included in the fast forwarding NAT table 1300 may be less than the number of entries included in the main NAT table 1700, thereby avoiding increase of overhead. However, this is merely exemplary and does not limit the disclosure.

FIG. 21 is a conceptual diagram for describing an example operation of the processor allocator 1400 of FIG. 4.

As described with reference to FIG. 10, the processor allocator 1400 may select a processor which is to process a packet, based on a kind of an interface protocol. In some example embodiments, the processor allocator 1400 may select a processor which is to process a packet, based on the fast forwarding process PFF to be performed in addition to the kind of the interface protocol. For example, when a packet received at the processor allocator 1400 is to be processed with the fast forwarding process PFF, the processor allocator 1400 may allocate processing the packet to the processor 1570.

To this end, for example, the processor allocator 1400 may refer to the signature SGN in the buffer 1600. Alternatively, for example, a packet may accompany a value for requesting the fast forwarding process PFF in addition to or instead of values indicating kinds of interface protocols associated with receiving and outputting the packet. In this example, the processor allocator 1400 may perform a hash operation on the value for requesting the fast forwarding process PFF, to select the processor 1570 to process the packet.

Figure 22:
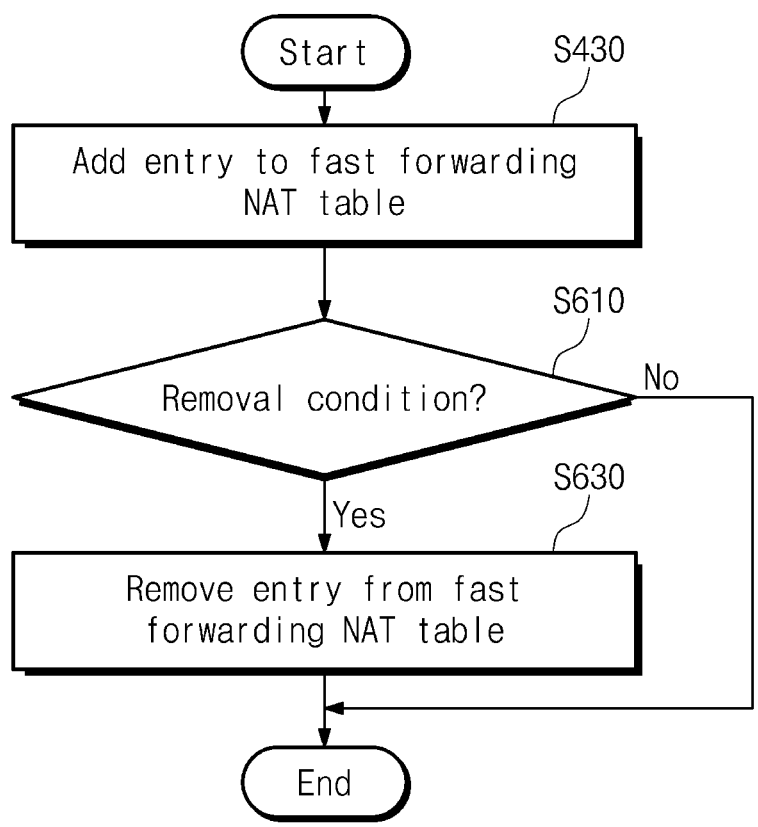
FIG. 22 is a flowchart describing an example operation of an electronic apparatus of FIG. 4.

FIG. 22 is a flowchart describing an example operation of the electronic apparatus 1000 of FIG. 4.

In the example of FIG. 15, when the condition for performing the fast forwarding process PFF is satisfied, the processor 1510 may add a related entry to the fast forwarding NAT table 1300 (S430). Next, while the fast forwarding process PFF is performed, the processor 1510 may monitor whether a removal condition is satisfied (S610).

The removal condition may be a condition for stopping or terminating the fast forwarding process PFF and removing the related entry added to the fast forwarding NAT table 1300. For example, the removal condition may be satisfied when a session of communication between a source device and a destination device associated with packets processed by the fast forwarding process PFF expires.

The disclosure is not limited to the example above, and the removal condition may be variously changed or modified. For example, the removal condition may be satisfied when a corresponding entry in the main NAT table 1700 is removed or it is difficult to perform the fast forwarding process PFF due to a communication error or fault. In some cases, the removal condition may be satisfied when an increased bandwidth or an increased amount of data becomes less than a reference value or a threshold. For example, the removal condition may be satisfied in response to a request of a user or a request on an operation policy.

When the removal condition is not satisfied ('No' at S610), the fast forwarding process PFF may be continued. When the removal condition is satisfied ('Yes' at S610), the related entry may be removed from the fast forwarding NAT table 1300 under control of the processors 1500 (S630). Thus, the information of the first address and the second address stored in the fast forwarding NAT table 1300 may be removed.

Next, packets which each includes the first address that corresponds to the entry removed from the fast forwarding NAT table 1300 may be processed through the main translation process PMT (S300 of FIG. 8). In this regard, the processors 1500 may receive a packet including the first address which is not translated to the second address, and the buffer 1600 may store the packet including the first address without the signature SGN.

Figure 23:
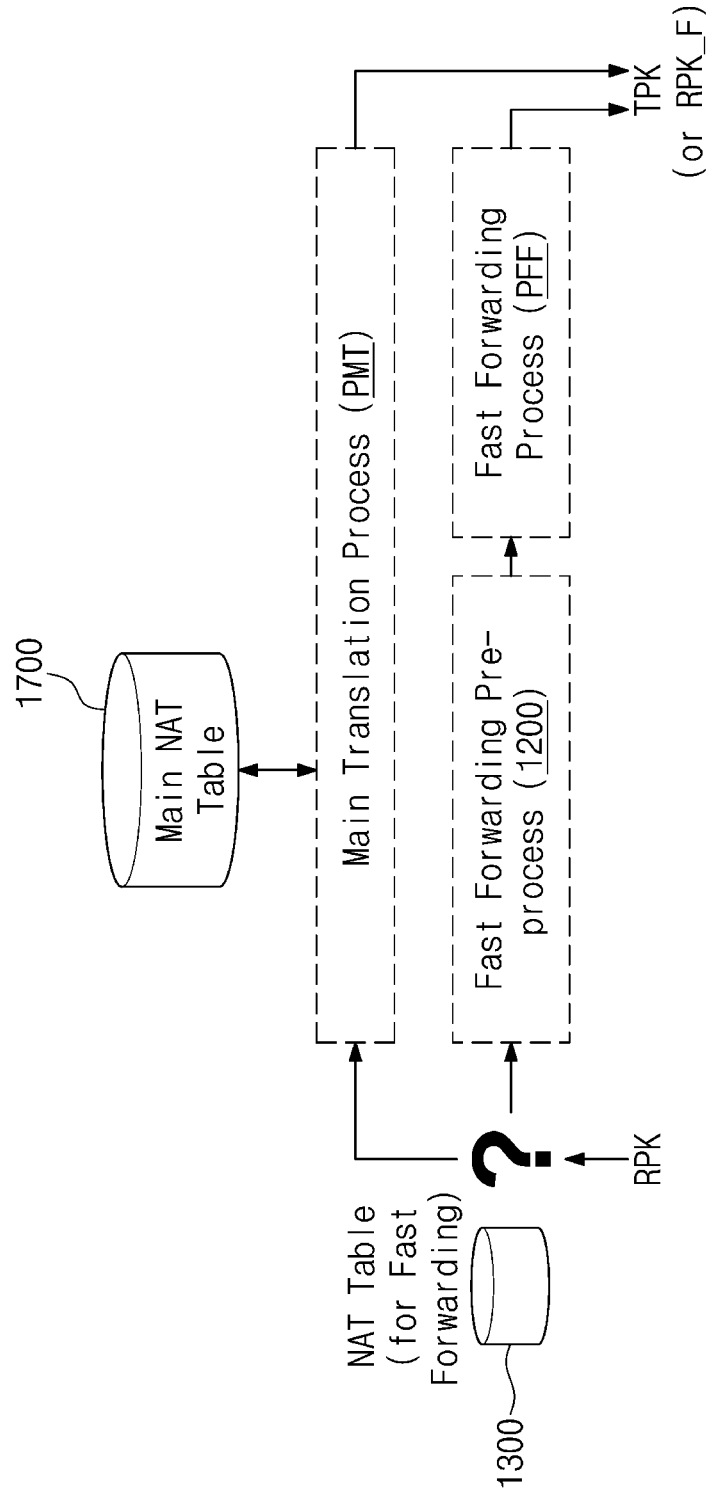
FIGS. 23 and 24 are conceptual diagrams for describing example operations of an electronic apparatus of FIG. 4.

FIG. 23 is a conceptual diagram for describing an example operation of the electronic apparatus 1000 of FIG. 4.

In example embodiments, an additional network address translation table (e.g., the fast forwarding NAT table 1300) may be used separately from the main NAT table 1700. When the packet RPK is received, one of two different processes may be performed based on whether an entry corresponding to the packet RPK is stored in the fast forwarding NAT table 1300.

When the entry corresponding to the packet RPK is not stored in the fast forwarding NAT table 1300, the processors 1500 may perform the main translation process PMT with reference to the main NAT table 1700. The processors 1500 may perform the network address translation for the packet RPK through the main translation process PMT, and may output the processed packet TPK.

When the entry corresponding to the packet RPK is stored in the fast forwarding NAT table 1300, the fast forwarding manager 1200 may perform the fast forwarding pre-process. In the fast forwarding pre-process, the fast forwarding manager 1200 may perform the network address translation for the packet RPK with reference to the fast forwarding NAT table 1300 in advance before processing a packet is allocated to the processors 1500. Thus, the fast forwarding manager 1200 may generate the packet RPK_F including the translated second address.

Next, the processors 1500 may forward the packet RPK_F without additional address translation. The processors 1500 may output the forwarded packet RPK_F through the fast forwarding process PFF.

Based on comparison between FIG. 11 and FIG. 17 and comparison between FIG. 14 and FIG. 20, it may be understood that the fast forwarding pre-process and the fast forwarding process PFF are performed in a more simple and rapid manner than the main translation process PMT. A time taken to process the network address translation by the fast forwarding manager 1200 may be shorter than a time taken to process the network address translation by the processors 1500. The fast forwarding process PFF may use the packet RPK_F converted in the fast forwarding pre-process without additional address translation.

Thus, the fast forwarding process PFF may decrease a time taken to perform the network address translation, and the packet may be rapidly transferred from a source device to a destination device. As a result, the fast forwarding process PFF may improve communication performance, and a large amount of data may be communicated with high communication performance.

Because the fast forwarding process PFF provides higher communication performance, a bandwidth required for outputting packets to the destination device after the fast forwarding manager 1200 performs the fast forwarding pre-process may be greater than a bandwidth required for outputting packets to the destination device after the processors 1500 performs the main translation process PMT.

Figure 24:
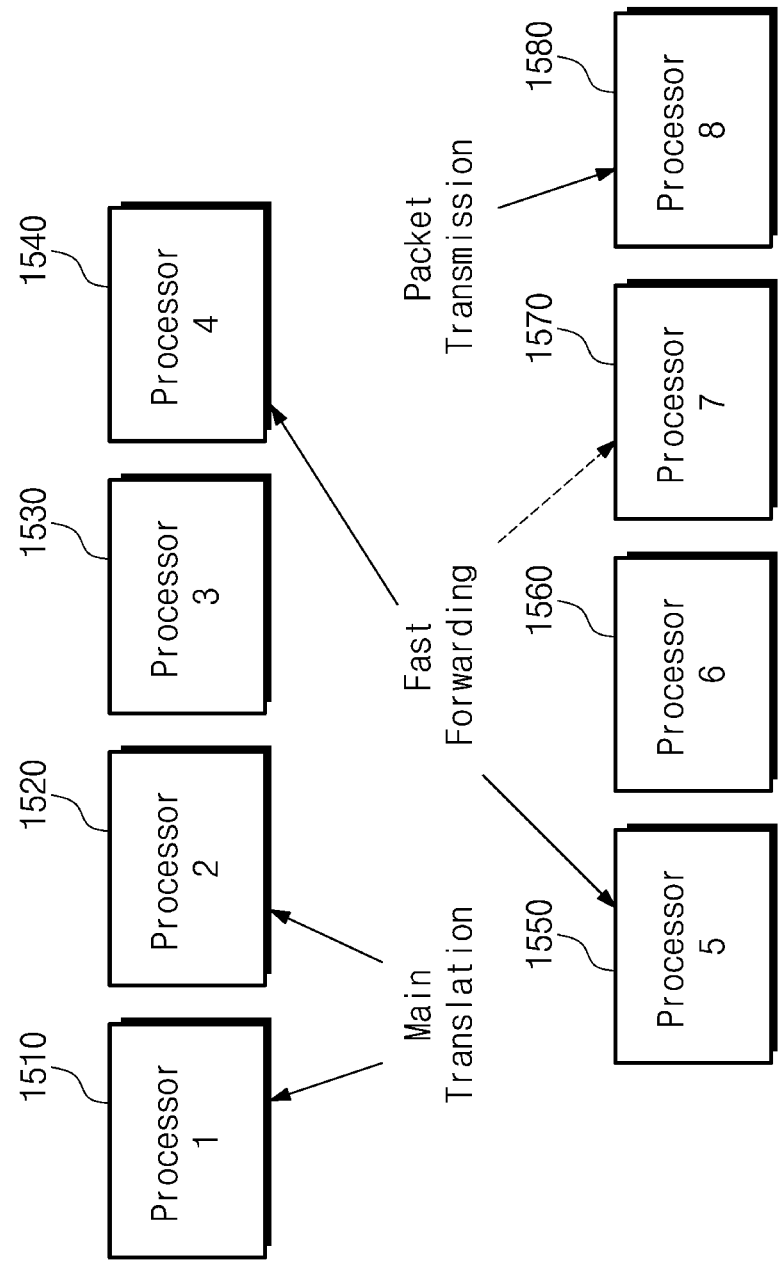

FIG. 24 is a conceptual diagram for describing an example operation of the electronic apparatus 1000 of FIG. 4.

As described above, a processor (e.g., the processor 1510 or the processor 1520) allocated for the main translation process PMT may be selected based on an interface protocol (e.g., RmNet) associated with receiving a packet. A processor (e.g., the processor 1540 or the processor 1550) allocated for the fast forwarding process PFF may be selected based on an interface protocol (e.g., Wi-Fi) associated with outputting a packet. In some cases, a processor (e.g., the processor 1570) allocated for the fast forwarding process PFF may be selected based on a request of the fast forwarding process PFF.

In addition, a processor (e.g., the processor 1580) which is to process outputting a packet may be selected such that the selected processor is different from a processor which performs the main translation process PMT and/or a processor which performs the fast forwarding process PFF. Thus, a processor to which a task for processing a packet is allocated may be separate from a processor to which a task for receiving and outputting the packet is allocated. In this manner, for example, when one processor is wholly responsible for outputting packets, it is prevented that an order of outputting the packets may become out of order.

In example embodiments, processes associated with packets may be distributively performed on several processors. For example, translating a first address of a packet to a second address through the main translation process PMT, processing the packet including the second address such that the packet is to be forwarded to the destination device, and providing the transmission interface circuit 1800 with the packet including the second address may be distributively allocated on different processors of the processors 1500. Thus, an excessive load may be prevented from being concentrated on a specific processor, and processor resources may be efficiently used.

Figure 25:
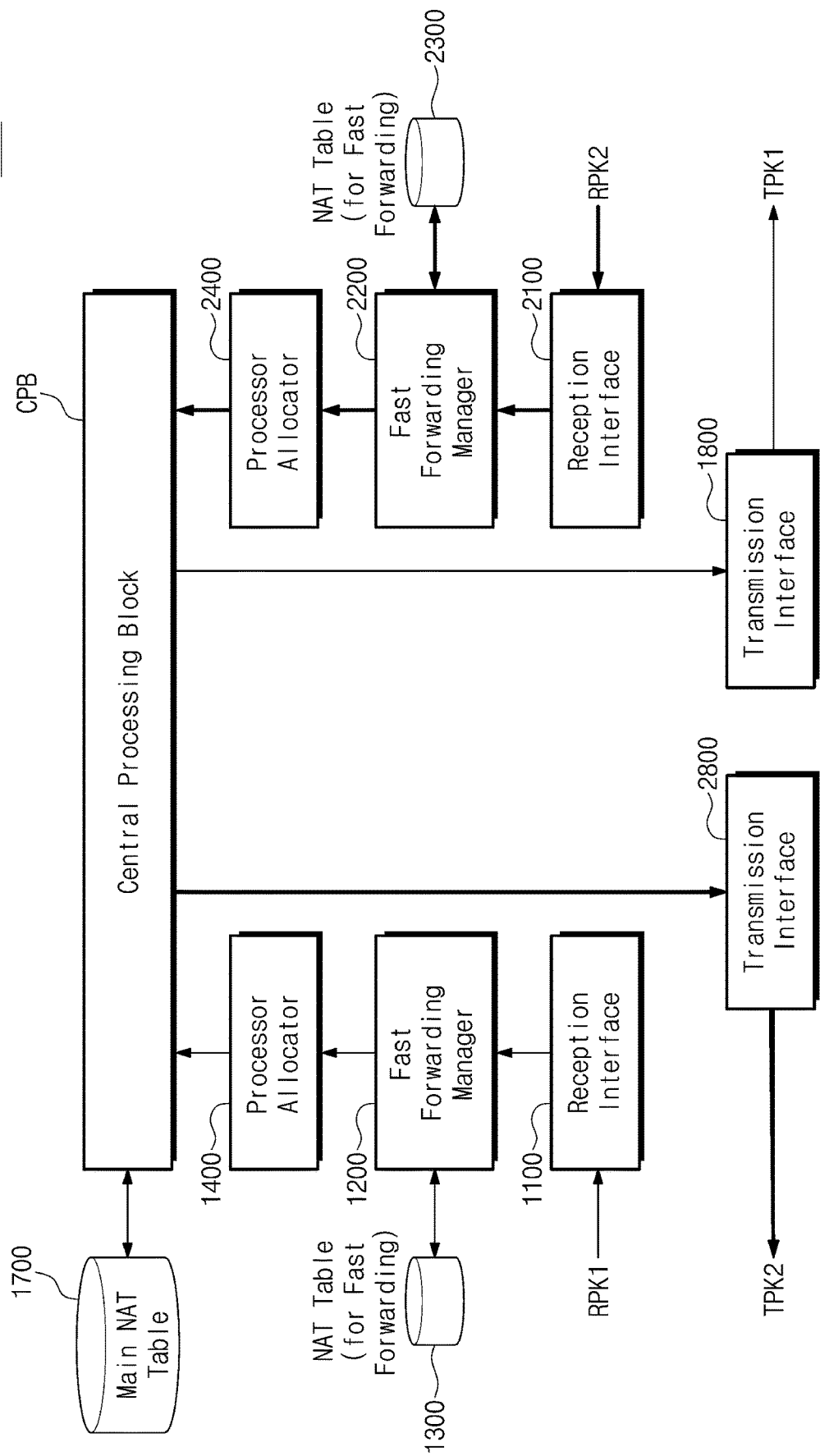
FIG. 25 is a block diagram illustrating an example configuration associated with a network address translator of FIG. 1.

FIG. 25 is a block diagram illustrating an example configuration associated with the network address translator 120 or 140 of FIG. 1.

In some example embodiments, the network address translator 120 and/or 140 of FIG. 1 may be implemented in an electronic apparatus 2000. In addition to components of the electronic apparatus 1000, the electronic apparatus 2000 may further include a reception interface circuit 2100, a fast forwarding manager 2200, a fast forwarding NAT table 2300, a processor allocator 2400, and a transmission interface circuit 2800.

The reception interface circuit 1100, the fast forwarding manager 1200, the fast forwarding NAT table 1300, the processor allocator 1400, the central processing block CPB, the main NAT table 1700, and the transmission interface circuit 1800 may perform the main translation process PMT and/or the fast forwarding process PFF according to the example embodiments described with reference to FIGS. 4 to 24 and thus may output a packet TPK1 converted from a packet RPK1.

The reception interface circuit 2100, the fast forwarding manager 2200, the fast forwarding NAT table 2300, the processor allocator 2400, and the transmission interface circuit 2800 may be configured and may operate substantially the same or similar to the reception interface circuit 1100, the fast forwarding manager 1200, the fast forwarding NAT table 1300, the processor allocator 1400, and the transmission interface circuit 1800.

The reception interface circuit 2100, the fast forwarding manager 2200, the fast forwarding NAT table 2300, the processor allocator 2400, the central processing block CPB, the main NAT table 1700, and the transmission interface circuit 2800 may perform the main translation process PMT and/or the fast forwarding process PFF according to the example embodiments described with reference to FIGS. 4 to 24 and thus may output a packet TPK2 converted from a packet RPK2.

The electronic apparatus 2000 may be connected to a first device via the reception interface circuit 1100 and the transmission interface circuit 2800. The electronic apparatus 2000 may receive the packet RPK1 from the first device and may output the packet TPK2 to the first device. The electronic apparatus 2000 may be connected to a second device via the reception interface circuit 2100 and the transmission interface circuit 1800. The electronic apparatus 2000 may receive the packet RPK2 from the second device and may output the packet TPK1 to the second device. Thus, the main translation process PMT and the fast forwarding process PFF may be performed in a bidirectional manner.

According to example embodiments, a time taken to perform network address translation may be reduced, and a packet may be rapidly transferred from a source device to a destination device. Thus, communication performance may be improved.

At least one of the components, elements, modules or units described herein may be embodied as various numbers of hardware, software and/or firmware structures that execute respective functions described above, according to an embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

While a few example embodiments have been described above, the scope of the disclosure is not limited thereto and various modifications and improvements made by those of ordinary skill in the art to concepts defined in the following claims should be understood to fall within the scope of the disclosure.

What is claimed is:

1. An electronic apparatus comprising:
a first translation table configured to store information of a first address and information of a second address;
at least one processor configured to determine whether a condition for performing fast forwarding processing is satisfied by monitoring a traffic status for packets including the second address, and enable the fast forwarding processing based on a determination that the condition is satisfied, the condition being satisfied when a bandwidth required to output at least one of the packets is greater than a reference value;
a second translation table configured to, based on the determination that the condition is satisfied, store the information of the first address and the information of the second address, related to monitored packets, based on the first translation table;
a forwarding manager configured to receive a first packet including the first address from a source device and, based on a determination that the fast forwarding processing is enabled and a determination that an entry matching with the first address of the first packet is stored in the second translation table, translate the first address of the first packet to the second address by using the matching entry in the second translation table; and
a processor allocator configured to select, among the at least one processor, a processor which is to process the first packet, processed by the forwarding manager, or a second packet, which is received from the source device when the fast forwarding processing is not enabled, and allocate the first packet or the second packet to the selected processor,
wherein the at least one processor is further configured to, when allocated with the second packet by the processor allocator, translate the first address of the second packet to the second address by using the first translation table, and when allocated with the first packet by the processor allocator, not to perform translation of the first address of the first packet to the second address.

2. The electronic apparatus of claim 1, further comprising:
an interface circuit configured to communicate with a destination apparatus and configured to output the first packet and the second packet processed by the at least one processor to the destination apparatus.

3. The electronic apparatus of claim 2, wherein
in response to detecting that the destination apparatus is connected with the interface circuit, the at least one processor is further configured to obtain device information indicating at least one of an internal configuration of the destination apparatus and an interface protocol that supports communication between the destination apparatus and the interface circuit.

4. The electronic apparatus of claim 3, wherein
the second translation table is further configured to store the information of the first address and the information of the second address corresponding to all or some of the device information of the destination apparatus.

5. The electronic apparatus of claim 1, wherein the forwarding manager is further configured to generate a signature, the signature indicating that the first address of the second packet has been translated into the second address.

6. The electronic apparatus of claim 1, further comprising:
a first interface circuit to receive the first packet and the second packet, each including the first address, from the source device based on a first interface protocol; and
a second interface circuit to output the first packet and the second packet, each including the second address, to a destination apparatus based on a second interface protocol.

7. The electronic apparatus of claim 6, wherein a first processor is selected among the at least one processor based on a kind of the second interface protocol, the first processor configured to forward the second packet including the second address to the destination apparatus.

8. The electronic apparatus of claim 1, wherein
the at least one processor is configured to receive the second packet including the second address, without translating the first address to the second address with regard to the second packet.

9. An electronic apparatus comprising:
a first translation table configured to, in response to a first condition for performing fast forwarding processing is satisfied being satisfied, store information of a first address and information of a second address;
at least one processor configured to determine whether the first condition is satisfied by monitoring a traffic status for packets including the second address, and enable the fast forwarding processing based on a determination that the first condition is satisfied, the first condition being satisfied when a bandwidth required to output at least one of the packets is greater than a reference value;
a forwarding manager configured to receive a first packet including the first address from a source device and, based on a determination that the fast forwarding processing is enabled and a determination that an entry matching with the first address of the first packet is stored in the first translation table, translate the first address of the first packet to the second address by using the matching entry in the first translation table;
a processor allocator configured to select, among the at least one processor, a processor which is to process the first packet, processed by the forwarding manager, or a second packet, which is received from the source device when the fast forwarding processing is not enabled, and allocate the first packet or the second packet to the selected processor; and
a buffer configured to store the first packet including the second address and a signature indicating that the first address of the first packet has been translated into the second address,
wherein the at least one processor is further configured to receive the first packet including the second address, without translating the first address to the second address, and process the first packet including the second address to output the processed first packet.

10. The electronic apparatus of claim 9, wherein the at least one processor comprises:
a first processor configured to process forwarding the first packet including the second address to a destination apparatus based on the signature, and
a second processor configured to, in response to switching from the first processor to the second processor, output the processed first packet including the second address to the destination apparatus.

11. The electronic apparatus of claim 10, wherein
the first processor is selected among the at least one processor based on a kind of an interface protocol which is associated with outputting the first packet.

12. The electronic apparatus of claim 9, wherein
in response to a second condition being satisfied, the information of the first address and the information of the second address are removed from the first translation table.

13. The electronic apparatus of claim 12, wherein
the second condition is that a session of communication between the source device and a destination apparatus associated with the first packet expires.

14. The electronic apparatus of claim 12, wherein
in response to the information of the first address and the information of the second address being removed from the first translation table and a third packet including the first address being received, the buffer is configured to store the third packet including the first address without the signature.

15. The electronic apparatus of claim 14, further comprising:
a second translation table configured to store the information of the first address and the information of the second address irrespective of satisfaction of the first condition, wherein
the at least one processor is configured to, in response to the first condition not being met, translate the first address of the third packet to the second address based on the second translation table.

16. An electronic apparatus comprising:
at least one processor configured to determine whether a condition for performing fast forwarding processing is satisfied by monitoring a traffic status for packets including a second address, and enable the fast forwarding processing based on a determination that the condition is satisfied, the condition being satisfied when a bandwidth required to output at least one of the packets is greater than a reference value;
a forwarding manager configured to receive a first packet including a first address from a source device and, based on a determination that the fast forwarding processing is enabled, translate the first address of the first packet to the second address;
a processor allocator configured to select, among the at least one processor, a processor which is to process the first packet, processed by the forwarding manager, or a second packet, which is received from the source device when the fast forwarding processing is not enabled, and allocate the first packet or the second packet to the selected processor;

wherein the at least one processor is further configured to, when allocated with the second packet by the processor, translate the first address of the second packet to the second address, and output the second packet in a communication between the source device and a destination apparatus; and wherein, in response to the first address of the first packet being translated by the forwarding manager, the at least one processor is configured to output the first packet without translating the first address to the second address.

17. The electronic apparatus of claim 16, wherein a bandwidth of outputting the first packet to the destination apparatus after address translation by the forwarding manager is greater than a bandwidth of outputting the second packet to the destination apparatus after address translation by the at least one processor.

18. The electronic apparatus of claim 16, wherein the forwarding manager is configured to perform address translation at a time period that is shorter than a time period to perform address translation by the at least one processor.

* * * * *